US012459640B2

(12) United States Patent
Nunes et al.

(10) Patent No.: US 12,459,640 B2
(45) Date of Patent: Nov. 4, 2025

(54) AIRCRAFT WITH A MULTI-FAN PROPULSION SYSTEM FOR CONTROLLING FLIGHT ORIENTATION TRANSITIONS

(71) Applicant: General Electric Company, Schenectady, NY (US)

(72) Inventors: Alexis Raquel Nunes, West Chester, OH (US); Kurt David Murrow, Dayton, OH (US)

(73) Assignee: General Electric Company, Evendale, OH (US)

( * ) Notice: Subject to any disclaimer, the term of this patent is extended or adjusted under 35 U.S.C. 154(b) by 552 days.

(21) Appl. No.: 17/244,280

(22) Filed: Apr. 29, 2021

(65) Prior Publication Data

US 2022/0350348 A1   Nov. 3, 2022

(51) Int. Cl.
*B64C 29/02*   (2006.01)
*B64U 10/20*   (2023.01)
*B64U 30/10*   (2023.01)
*B64U 50/12*   (2023.01)
*B64U 50/14*   (2023.01)
*B64U 101/30*  (2023.01)
*G05D 1/00*    (2024.01)

(52) U.S. Cl.
CPC .............. *B64C 29/02* (2013.01); *B64U 10/20* (2023.01); *B64U 30/10* (2023.01); *B64U 50/12* (2023.01); *B64U 50/14* (2023.01); *G05D 1/102* (2013.01); *B64U 2101/30* (2023.01)

(58) Field of Classification Search
CPC .... G05D 1/102; B64C 29/02; B64C 29/0008; B64D 27/24; B64U 10/20; B64U 50/14; B64U 10/00
See application file for complete search history.

(56) References Cited

U.S. PATENT DOCUMENTS 3,075,728 A   1/1963  Kogan
3,089,666 A   5/1963  Quenzler
(Continued)

FOREIGN PATENT DOCUMENTS

CN   206734609 U   12/2017
CN   110775262 A    2/2020
(Continued)

*Primary Examiner* — Donald J Wallace
*Assistant Examiner* — Jalal C Coduroglu
(74) *Attorney, Agent, or Firm* — Dority & Manning, P.A.

(57) ABSTRACT

An aircraft equipped with a multi-fan propulsion system for controlling flight orientation transitions is provided. In one example aspect, an aircraft includes a fuselage and a pair of wings. The aircraft includes a propulsion system having a first propulsor and a second propulsor each mounted to the fuselage. The first propulsor has a fan positioned primarily above and the second propulsor has a fan positioned primarily below the pair of wings. The aircraft also includes a computing system having one or more processors configured to cause, in response to a demand to change an orientation of the aircraft for a flight orientation transition, the fans of the first and second propulsors to produce different amounts of thrust with respect to one another so that the aircraft performs the flight orientation transition. The thrust differential causes the aircraft to transition between orientations.

20 Claims, 9 Drawing Sheets

(56) References Cited

U.S. PATENT DOCUMENTS

| | | | |
|---|---|---|---|
| 3,109,614 | A | 11/1963 | Steidl |
| 3,231,221 | A | 1/1966 | Platt |
| 3,455,523 | A | 7/1969 | Hertel |
| 5,135,185 | A | 8/1992 | Adamson et al. |
| 7,328,870 | B2 | 2/2008 | Lazare |
| 7,877,980 | B2 | 2/2011 | Johnson |
| 8,128,023 | B2 | 3/2012 | Cazals |
| 8,402,740 | B2 | 3/2013 | Guemmer |
| 8,800,912 | B2 | 8/2014 | Oliver |
| 9,096,312 | B2 | 8/2015 | Moxon |
| 9,669,924 | B2 | 6/2017 | Chan |
| 10,570,926 | B2 | 2/2020 | Maciolek |
| 10,641,290 | B1 | 5/2020 | Piasecki et al. |
| 10,913,531 | B2 | 2/2021 | Hulsman et al. |
| 11,639,220 | B1 * | 5/2023 | Erdozain, Jr. ........... B64C 29/02 244/7 B |
| 2007/0057113 | A1 * | 3/2007 | Parks .................. B64C 29/0041 244/12.5 |
| 2007/0069065 | A1 * | 3/2007 | Parks .................. G05D 1/0669 244/7 B |
| 2007/0215748 | A1 * | 9/2007 | Robbins .............. B64C 29/0066 244/12.5 |
| 2009/0229243 | A1 * | 9/2009 | Guemmer ............. B64D 27/12 60/226.1 |
| 2017/0057650 | A1 * | 3/2017 | Walter-Robinson ........................ H02J 7/0068 |
| 2017/0158325 | A1 | 6/2017 | Chen |
| 2017/0233070 | A1 | 8/2017 | Starace et al. |
| 2017/0240286 | A1 * | 8/2017 | Lemarchand ......... B64D 35/04 |
| 2017/0320570 | A1 * | 11/2017 | Horn ...................... B64C 29/02 |
| 2018/0105267 | A1 * | 4/2018 | Tighe ................. B64C 29/0025 |
| 2018/0105279 | A1 * | 4/2018 | Tighe .................... B64D 29/02 |
| 2018/0362171 | A1 | 12/2018 | Curchod |
| 2019/0031363 | A1 * | 1/2019 | Hoisington ........... B64D 35/04 |
| 2020/0023964 | A1 * | 1/2020 | Valente ................. B64U 10/13 |
| 2020/0164974 | A1 * | 5/2020 | Parks .................... B64D 27/24 |
| 2020/0324906 | A1 * | 10/2020 | Vondrell ............... B64D 27/12 |
| 2020/0398982 | A1 * | 12/2020 | Valente ................ B64C 39/024 |
| 2021/0245873 | A1 * | 8/2021 | Tighe ................... B60L 50/50 |
| 2022/0089279 | A1 * | 3/2022 | Rosen ................... B64U 30/10 |
| 2022/0219818 | A1 * | 7/2022 | Valente ................ B64U 10/13 |
| 2022/0250755 | A1 * | 8/2022 | Hull ..................... B64U 50/19 |
| 2022/0315205 | A1 * | 10/2022 | Moy .................... G05D 1/0858 |

FOREIGN PATENT DOCUMENTS

| | | | | |
|---|---|---|---|---|
| DE | 102011012503 | A1 | 8/2012 | |
| EP | 2089273 | A1 | 8/2009 | |
| GB | 1187375 | A | 4/1970 | |
| JP | 2010254264 | A | 11/2010 | |
| KR | 2018089086 | A * | 8/2018 | ........... B64C 23/065 |
| KR | 20180089086 | A | 8/2018 | |
| RU | 128182 | U1 | 5/2013 | |
| WO | WO2013039853 | A1 | 3/2013 | |
| WO | WO2015166430 | A1 | 11/2015 | |

* cited by examiner

280 ↘

| PROPULSOR | TAKEOFF | ORIENTATION TRANSITION | | | CRUISE |
|---|---|---|---|---|---|
| | | S1 | S2 | S3 | |
| 160 | 90% | 90% | 85% | 80% | 80% |
| 170 | 90% | 45% | 60% | 75% | 80% |
| 180 | 90% | 80% | 80% | 80% | 80% |
| 190 | 90% | 80% | 80% | 80% | 80% |

380 →

| PROPULSOR | CRUISE | ORIENTATION TRANSITION | | | LANDING |
|---|---|---|---|---|---|
| | | S1 | S2 | S3 | |
| 160 | 80% | 35% | 50% | 80% | 90% |
| 170 | 80% | 85% | 90% | 90% | 90% |
| 180 | 80% | 80% | 80% | 85% | 90% |
| 190 | 80% | 80% | 80% | 85% | 90% |

380 →

| PROPULSOR | CRUISE | ORIENTATION TRANSITION | | | LANDING |
|---|---|---|---|---|---|
| | | S1 | S2 | S3 | |
| 160 | 80% | 80% | 80% | 80% | 90% |
| 170 | 80% | 100% | 95% | 90% | 90% |
| 180 | 80% | 80% | 80% | 85% | 90% |
| 190 | 80% | 80% | 80% | 85% | 90% |

AIRCRAFT WITH A MULTI-FAN PROPULSION SYSTEM FOR CONTROLLING FLIGHT ORIENTATION TRANSITIONS

FIELD

The present subject matter relates generally to aircraft and methods of operating the same.

BACKGROUND

Some fixed-wing Vertical Take-Off and Landing (VTOL) aircraft have a tail-sitter configuration. Generally, a tail-sitter aircraft sits vertically on its tail when grounded and remains vertically oriented for takeoffs. After takeoff, the whole aircraft transitions from a vertical orientation to a horizontal orientation, e.g., for cruise flight. For approach and landing, the whole aircraft transitions from the horizontal orientation to the vertical orientation and ultimately lands on its tail. One challenge associated with tail-sitter aircraft is transitioning from a vertical orientation to a horizontal orientation and vice versa. Producing a thrust moment to transition a tail-sitter aircraft from horizontal to vertical flight while maintaining the stability of the aircraft has proven especially challenging.

Thus, an aircraft having a tail-sitter configuration that addresses one or more of the challenges noted above would be a useful addition to the art.

BRIEF DESCRIPTION

Aspects and advantages of the invention will be set forth in part in the following description, or may be obvious from the description, or may be learned through practice of the invention.

In one aspect, an aircraft is provided. The aircraft has a fuselage and a pair of wings extending outward from the fuselage opposite one another. The aircraft also includes a propulsion system having a first propulsor and a second propulsor each mounted to the fuselage. The first propulsor has a fan positioned primarily above the pair of wings as determined when the aircraft is in a horizontal orientation. The second propulsor has a fan positioned primarily below the pair of wings as determined when the aircraft is in the horizontal orientation. The aircraft further includes a computing system having one or more processors, the one or more processors being configured to: cause, in response to a demand to change an orientation of the aircraft for a flight orientation transition in which the aircraft is transitioned from a vertical orientation to a horizontal orientation or a horizontal orientation to a vertical orientation, the fan of the first propulsor and the fan of the second propulsor to produce different amounts of thrust with respect to one another so that the aircraft performs the flight orientation transition.

In another aspect, a method of operating an aircraft is provided. The method includes receiving an input indicating a demand to change an orientation of the aircraft for a flight orientation transition in which the aircraft is transitioned from a vertical orientation to a horizontal orientation or a horizontal orientation to a vertical orientation. Further, the method includes causing, in response to the input, one or more fans of a propulsor array positioned primarily above a pair of wings of the aircraft, as determined when the aircraft is in the horizontal orientation, to collectively produce a different amount of thrust than one or more fans of the propulsor array positioned primarily below the pair of wings, as determined when the aircraft is in the horizontal orientation, collectively produce so that the aircraft performs the flight orientation transition.

In yet another aspect, a non-transitory computer readable medium is provided. The non-transitory computer-readable medium includes computer-executable instructions, which, when executed by one or more processors of a computing system of an aircraft, cause the one or more processors to: cause, in response to a demand to change an orientation of the aircraft for a flight orientation transition in which the aircraft is transitioned from a vertical orientation to a horizontal orientation or a horizontal orientation to a vertical orientation, a fan of a first propulsor and a fan of a second propulsor to produce different amounts of thrust with respect to one another so that the aircraft performs the flight orientation transition, the fan of the first propulsor being positioned primarily above and the fan of the second propulsor being positioned primarily below one or more wings of the aircraft as determined when the aircraft is in the horizontal orientation.

These and other features, aspects and advantages of the present subject matter will become better understood with reference to the following description and appended claims. The accompanying drawings, which are incorporated in and constitute a part of this specification, illustrate embodiments of the subject matter and, together with the description, explain the principles of the subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
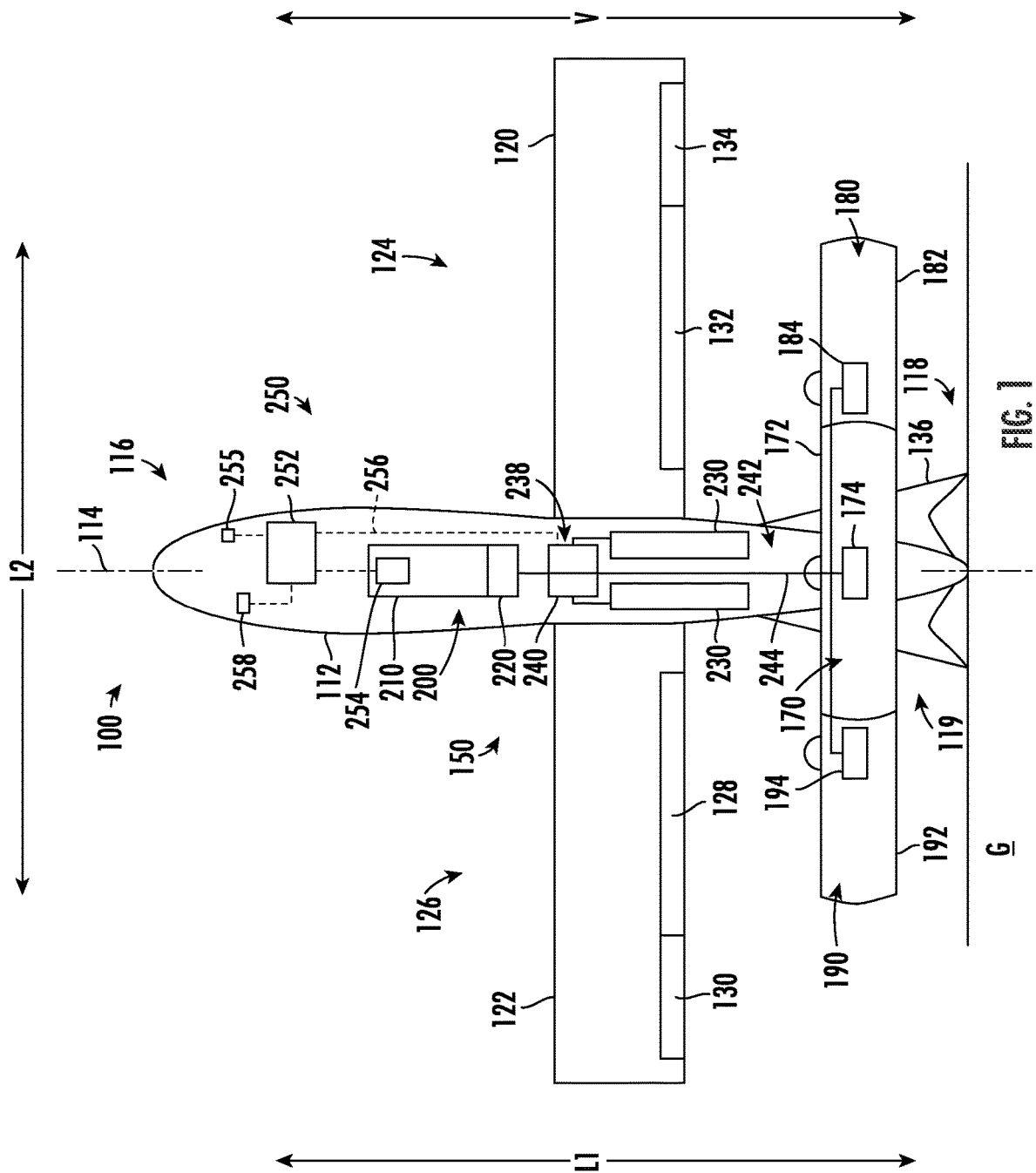
FIG. 1 provides a schematic elevation view of an aircraft oriented in a vertical orientation according to one example embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent (10%) margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an aircraft equipped with a multi-fan propulsion system for controlling flight orientation transitions. For instance, the multi-fan propulsion system can be used to control the aircraft in a vertical-to-horizontal orientation transition in which the aircraft transitions from a vertical orientation to a horizontal orientation. In addition, the multi-fan propulsion system can be used to control the aircraft in a horizontal-to-vertical orientation transition in which the aircraft transitions from a horizontal orientation to a vertical orientation. Such a multi-fan propulsion system may enable a fixed-wing Vertical Takeoff and Landing (VTOL) aircraft, such as an aircraft having a tail-sitter configuration, to transition between vertical and horizontal flight or vice versa in a controlled manner.

In one example aspect, an aircraft includes a fuselage and a pair of wings extending outward from the fuselage opposite one another. The longitudinal length of the fuselage generally defines the orientation of the aircraft. For instance, when the longitudinal length of the fuselage is oriented vertically, the aircraft is in a vertical orientation. When the longitudinal length of the fuselage is oriented horizontally, the aircraft is in a horizontal orientation.

The aircraft includes a propulsion system having a propulsor array. Each propulsor includes a rotatable fan operable to produce thrust. The fans can be electrically-driven fans. For instance, each fan can be driven by an associated electric machine. Electrical power generated by an electric generator or drawn from one or more battery banks can be provided to the electric machines so that they may drive their respective fans. The propulsor array can include a first propulsor having a fan positioned primarily above the pair of wings as determined when the aircraft is in a horizontal orientation. The propulsor array can also include a second propulsor having a fan positioned primarily below the pair of wings as determined when the aircraft is in the horizontal orientation. Further, the propulsor array can include other propulsors having fans. For instance, the propulsor array can include a third propulsor having a fan that is positioned circumferentially between the fans of the first and second propulsors. Further, the propulsor array can include a fourth propulsor having a fan that is positioned circumferentially between the fans of the first and second propulsors on an opposite side of the aircraft from the fan of the third propulsor. The fans of the first, second, third, and fourth propulsor can be mounted aft of the pair of wings. Further, the fans of the first, second, third, and fourth propulsor can be the arranged in equal circumferential spacing around the fuselage, for example.

The aircraft can include a computing system having one or more processors. The one or more processors are configured to cause, in response to a demand to change an orientation of the aircraft for a flight orientation transition in which the aircraft is transitioned from a vertical orientation to a horizontal orientation or a horizontal orientation to a vertical orientation, the first propulsor and the second propulsor to produce different amounts of thrust with respect to one another so that the aircraft performs the flight orientation transition. In this manner, a thrust differential is produced by the fan array. For instance, when the flight orientation transition is a vertical-to-horizontal flight transition, the fan of the first propulsor can be caused to produce more thrust than the fan of the second propulsor. In this regard, a large moment can be created, causing the aircraft to tilt or transition from a vertical orientation to a horizontal orientation. When the flight orientation transition is a horizontal-to-vertical flight transition, the second propulsor can be caused to produce more thrust than the first propulsor. In this manner, a large moment can be created, causing the aircraft to tilt or transition from a horizontal orientation to a vertical orientation.

The difference between the amount of thrust output by the fans of the first and second propulsors can be incrementally changed during a transition or tilt of the aircraft in a controlled manner. For instance, in a first segment of the transition, the differential may be relatively large to create the moment needed to commence the transition of the aircraft. In a later segment of the transition, however, the differential may be relatively small to slow the tilt or transition of the aircraft and to guide the aircraft into its desired orientation.

The subject matter of the present disclosure may expand the opportunities for VTOL aircraft, especially for tail-sitter configurations, and allows for a smaller, lighter, aircraft with more control and longer endurance. Indeed, heavy components associated with conventional VTOL aircrafts, such as tilt-rotor components and large empennages or tails for stabilizing an aircraft during transitions, are not needed. This translates to weight and fuel savings, which may be advantageous in both commercial and military applications.

As used herein, an aircraft that is vertically-oriented or in a vertical orientation is an aircraft whose fuselage (or the longitudinal length thereof) is oriented along or within 30 degrees of a vertical direction, which is a direction that spans perpendicular to a horizontal plane represented by the earth's surface and the aircraft. Further, as used herein, an aircraft that is horizontally-oriented or in a horizontal orientation is an aircraft whose fuselage (or the longitudinal length thereof) is oriented along or within 30 degrees of a direction orthogonal to the vertical direction.

Figure 2:
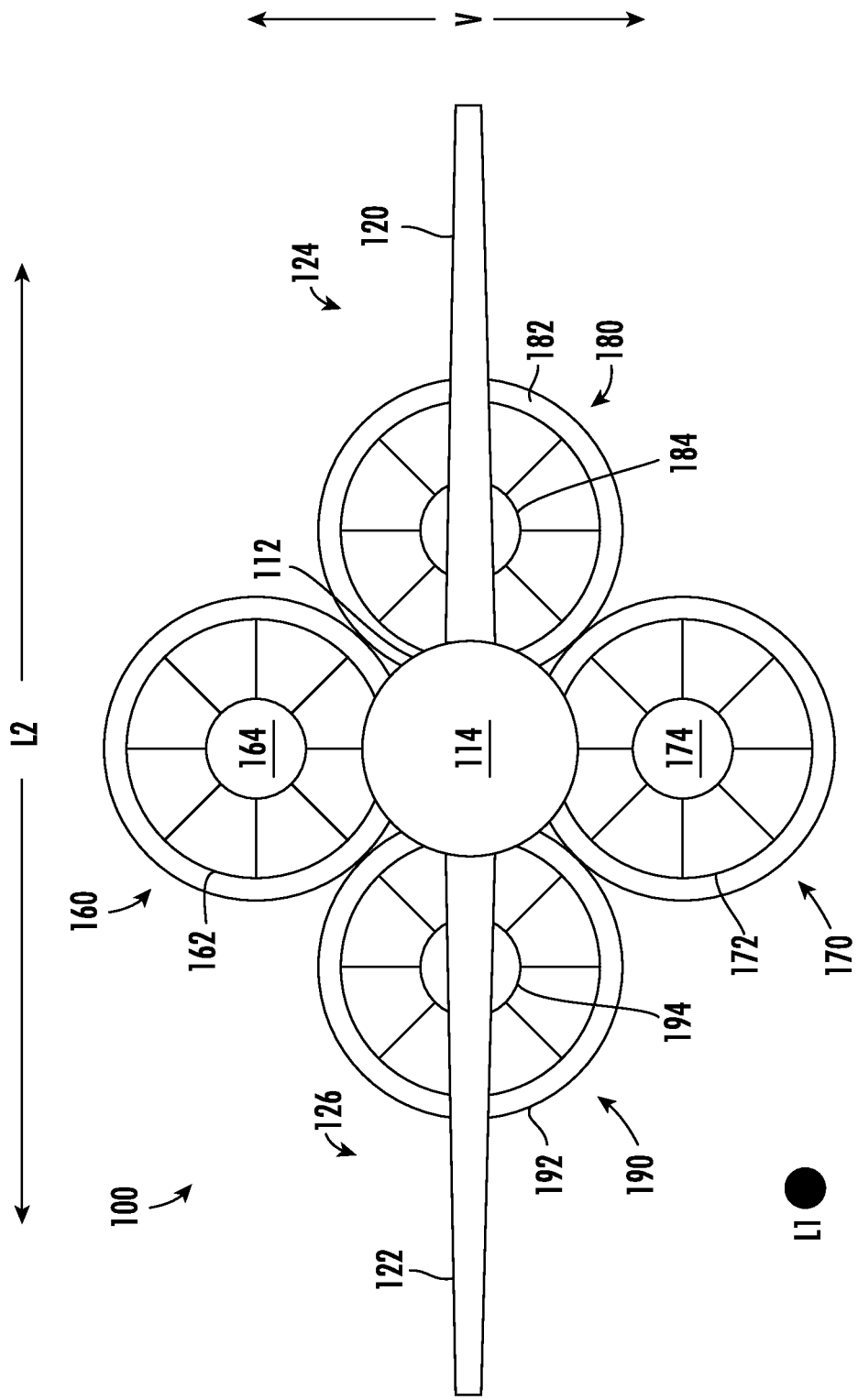
FIG. 2 provides a schematic forward-looking-aft view of the aircraft of FIG. 1 oriented in a horizontal orientation.
Figure 3:
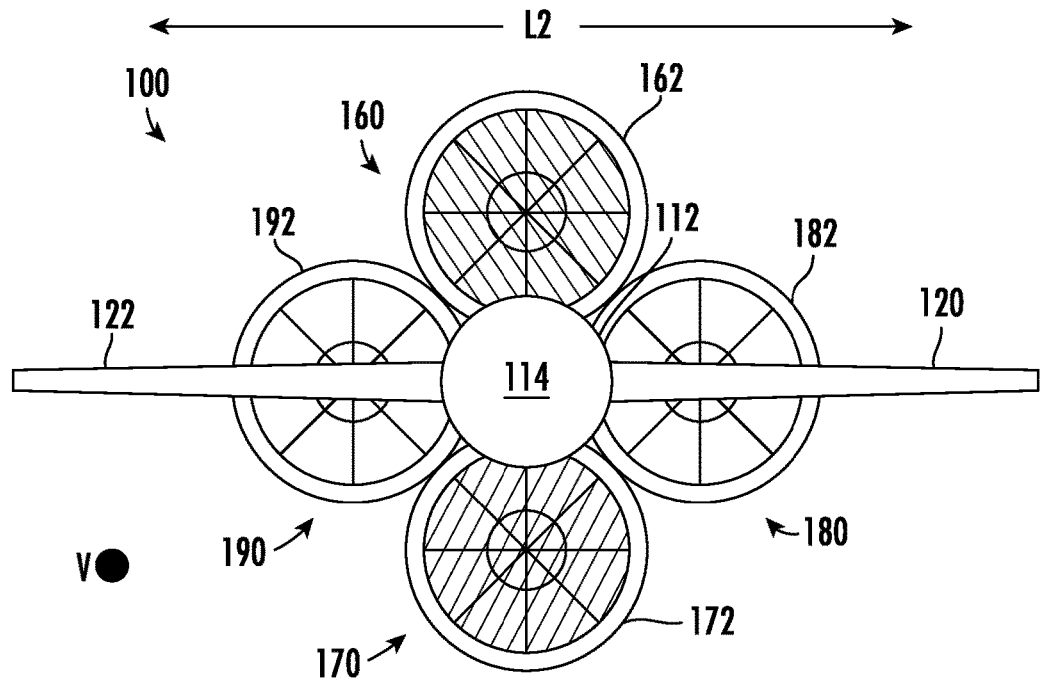
FIG. 3 provides a schematic top-looking-down view of the aircraft of FIG. 1 depicting the aircraft transitioning from a vertical orientation to a horizontal orientation.

With reference now to FIGS. 1 and 2, FIG. 1 provides a schematic elevation view of an aircraft 100 oriented in a vertical orientation according to one example embodiment of the present disclosure. FIG. 2 provides a schematic forward-looking-aft view of the aircraft 100 oriented in a horizontal orientation, e.g., during flight. For this embodiment, the aircraft 100 is a fixed-wing VTOL aircraft. Particularly, the aircraft 100 depicted in FIGS. 1 and 2 has a tail-sitter configuration. In this regard, the aircraft 100 sits vertically on its tail when grounded, as depicted in FIG. 1, and is vertically oriented for takeoffs. After takeoff, the whole aircraft 100 can transition from a vertical orientation to a horizontal orientation, e.g., for cruise flight. To land, the whole aircraft 100 can transition from the horizontal orientation to the vertical orientation. The aircraft 100 lands vertically-oriented on its tail. In some embodiments, the aircraft 100 can be an Unmanned Aerial Vehicle (UAV) that forms a part of an Unmanned Aerial System (UAS) or unmanned aircraft system. In other embodiments, the aircraft 100 can be a manned aircraft.

For reference, the aircraft 100 defines a longitudinal direction L1 and a lateral direction L2 extending perpendicular to the longitudinal direction L1. The aircraft 100 also defines a longitudinal centerline 114 that extends therethrough along the longitudinal direction L1.

As shown, the aircraft 100 extends between a forward end 116 and an aft end 118, e.g., along the longitudinal direction L1. The aircraft 100 includes a fuselage 112 that extends longitudinally from the forward end 116 of the aircraft 100 to the aft end 118 of the aircraft 100. In FIG. 1, the aircraft 100, or more particularly the fuselage 112, is vertically oriented along a vertical direction V. Stated another way, the longitudinal centerline 114 is oriented along the vertical direction V. In this regard, the aircraft 100 has a vertical orientation. The aircraft 100 also includes an empennage or tail 119 at the aft end 118 of the aircraft 100. In FIG. 1, the tail 119 of the aircraft 100 is sitting on the ground G, hence the tail-sitter configuration.

The aircraft 100 includes a pair of wings, including a first, port side wing 120 and a second, starboard side wing 122. The first and second wings 120, 122 each extend laterally outward from the fuselage 112 with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. For this embodiment, the first wing 120 includes one or more trailing edge flaps 128 and an aileron 130. Likewise, the second wing 122 includes one or more trailing edge flaps 132 and an aileron 134. The aircraft 100 can further include, or more specifically, the tail 119 of the aircraft 100 can include one or more stabilizers 136. Although not shown, the stabilizers 136 can include one or more rudders or other controlled surfaces for stabilizing the aircraft 100. It should be appreciated that in other exemplary embodiments, the aircraft 100 may additionally or alternatively include other control surfaces for controlling and/or stabilizing the aircraft 100.

The aircraft 100 of FIGS. 1 and 2 also includes a propulsion system 150. For this embodiment, the propulsion system 150 is a hybrid-electric propulsion system. In other embodiments, the propulsion system 150 may be a fully electric propulsion system. As depicted, the propulsion system 150 includes an array of propulsors operable to produce thrust. Particularly, for this embodiment, the array of propulsors includes a first propulsor 160, a second propulsor 170, a third propulsor 180, and a fourth propulsor 190. The propulsors 160, 170, 180, 190 are mounted to the aircraft 100 aft of the wings 120, 122 and are arranged in equal circumferential spacing around the fuselage 112. As will be explained herein, the propulsors 160, 170, 180, 190 can be individually controlled. In this manner, the propulsors 160, 170, 180, 190 can be controlled to produce different amounts of thrust. Particularly, the propulsors 160, 170, 180, 190 can be individually controlled to produce different amounts of thrust to change the flight orientation of the aircraft 100 in a controlled manner, e.g., from a horizontal orientation to a vertical orientation or vice versa.

Each propulsor 160, 170, 180, 190 has a fan and an associated electric machine operatively coupled thereto. As shown, the first propulsor 160 includes a fan 162 and an electric machine 164, e.g., for driving the fan 162 or generating electrical power when driven by the fan 162. The fan 162 includes a plurality of rotatable fan blades and a casing circumferentially surrounding the fan blades. In this regard, the fan 162 is a ducted fan. In other embodiments, however, the fan 162 can be unducted.

The second propulsor 170, third propulsor 180, and fourth propulsor 190 are similarly configured as the first propulsor 160. As depicted, the second propulsor 170 includes a fan 172 and an electric machine 174, e.g., for driving the fan 172 or generating electrical power when driven by the fan 172. The third propulsor 180 also includes a fan 182 and an electric machine 184, e.g., for driving the fan 182 or generating electrical power when driven by the fan 182. The fourth propulsor 190 includes a fan 192 and an electric machine 194, e.g., for driving the fan 192 or generating electrical power when driven by the fan 192. Moreover, for this embodiment, each electric machine 164, 174, 184, 194 is configured as an electric motor. However, in other example embodiments, one or more of the electric machines 164, 174, 184, 194 can be configured as a combination motor/generator. In yet other example embodiments, one or more of the electric machines 164, 174, 184, 194 can be configured solely as an electric generator.

Notably, the first propulsor 160 is mounted to the aircraft 100 so that the fan 162 is positioned primarily above the wings 120, 122 along the vertical direction V as determined when the aircraft 100 is in a horizontal orientation, e.g., as shown in FIG. 2. As shown best in FIG. 2, for this embodiment, the fan 162 of the first propulsor 160 is positioned entirely above the wings 120, 122 along the vertical direction V. In addition, for this embodiment, the fan 162 is positioned so as to be centered with respect to the fuselage 114 along the lateral direction L2. The second propulsor 170 is mounted to the aircraft 100 so that the fan 172 is positioned primarily below the wings 120, 122 along the vertical direction V as determined when the aircraft 100 is in the horizontal orientation, e.g., as shown in FIG. 2. Moreover, as shown best in FIG. 2, for this embodiment, the fan 172 of the second propulsor 170 is positioned entirely below the wings 120, 122 along the vertical direction V. Further, for this embodiment, the fan 172 is positioned so as to be centered with respect to the fuselage 114 along the lateral direction L2. Accordingly, for this embodiment, fan 162 and fan 172 are aligned with one another along the lateral direction L2. As used herein, "primarily" means that a disk defined by a given fan is positioned 50% or more above or below the stated object along the vertical direction V. The disk associated with a fan is an area that is swept out by the fan during operation. For example, where a fan has a radius R extending from a tip of one of the blades to an axis of rotation of the fan, the disk may be defined by as $A=\pi R^2$, wherein A is the area of the disk.

Moreover, for this embodiment, the third propulsor 180 is mounted to the aircraft 100 so that the fan 182 is aligned with the first wing 120 when viewed along the longitudinal direction L1, e.g., as shown in FIG. 2. Particularly, as depicted in forward-looking-aft view of FIG. 2, the fan 182 is shown aligned with the first wing 120 along the longitudinal direction L1, which is a direction into and out of the page of FIG. 2. In addition, as determined when the aircraft 100 is in the horizontal orientation, at least a portion of the fan 182 is positioned above the first wing 120 and at least a portion of the fan 182 is positioned below the first wing 120 along the vertical direction V.

The fourth propulsor 190 is mounted to the aircraft 100 so that the fan 192 is aligned with the second wing 122 when viewed along the longitudinal direction L1, e.g., as shown in FIG. 2. Particularly, as depicted in forward-looking-aft view of FIG. 2, the fan 192 is shown aligned with the second wing 122 along the longitudinal direction L1. Further, as determined when the aircraft 100 is in the horizontal orientation, at least a portion of the fan 192 is positioned above the second wing 122 and at least a portion of the fan 192 is positioned below the second wing 122 along the vertical direction V.

The mounting configuration of the fans 162, 172, 182, 192 depicted in FIGS. 1 and 2 can provide stability to the aircraft 100, particularly during takeoffs and landings of the aircraft 100. In addition, the staggered mounting configuration of the fans 162, 172, 182, 192 (i.e., one fan positioned above the wings 120, 122, one fan positioned below the wings 120, 122, and two fans positioned in line with the wings 120, 122) can provide a Boundary Layer Ingestion (BLI) benefit. Particularly, the staggered arrangement of the fans 162, 172, 182, 192 can be advantageous in that the fans are strategically arranged to ingest boundary layer airflow flowing along the fuselage 112. In this regard, the drag on the aircraft 100 can be reduced, thereby improving the propulsive efficiency of the propulsion system 150.

In some alternative embodiments, the fans 162, 172, 182, 192 can be mounted to the aircraft 100 in other suitable configurations. For instance, in some embodiments, fans 162, 182 can both be positioned fully or at least primarily above the wings 120, 122 (e.g., with the fans 162, 182 being positioned on respective sides 124, 126 of the aircraft 100) and fans 172, 192 can both be positioned fully or at least primarily below the wings 120, 122 (e.g., with the fans 172, 192 being positioned on respective sides 124, 126 of the aircraft 100). Such an arrangement can likewise provide stability to the aircraft 100, particularly during takeoffs and landings of the aircraft 100.

Furthermore, although the propulsion system 150 of the aircraft 100 is shown having four propulsors in FIGS. 1 and 2, in other embodiments, the aircraft 100 can include three propulsors or more than four propulsors. In this manner, the aircraft 100 can include at least three propulsors. In some example embodiments in which the aircraft 100 includes three propulsors, a first fan can be mounted to the aircraft 100 above or primarily above the wings 120, 122 while a second fan and a third fan can be mounted to the aircraft 100 below or primarily below the wings 120, 122 when viewed along the longitudinal direction L1. In other example embodiments in which the aircraft 100 includes three propulsors, a first fan and a second fan can be mounted to the aircraft 100 above or primarily above the wings 120, 122 while a third fan can be mounted to the aircraft 100 below or primarily below the wings 120, 122 when viewed along the longitudinal direction L1.

As noted above, for this embodiment, the propulsion system 150 is a hybrid-electric propulsion system. In this regard, the propulsion system 150 includes a turbo-generator 200, which is sometimes referred to as a turbogenerator set. The turbo-generator 200 includes a gas turbine engine 210 and an electric generator 220 operatively coupled with the gas turbine engine 210. The electric generator 220 can be operatively coupled with a spool of the gas turbine engine 210, can be coupled with the gas turbine engine 210 via a gearbox, or in some other suitable manner. The electric generator 220 is operable to convert mechanical power output by the gas turbine engine 210 into electrical power. The generated electrical power can be provided to various electrical loads of the aircraft 100, such as the electric machines 164, 174, 184, 194. In some alternative embodiments, the electric generator 220 can be a combination motor/generator.

The propulsion system 150 further includes one or more electric energy storage units 230 electrically connectable to the electric machines 164, 174, 184, 194, and in some embodiments, other electrical loads. Although two electric energy storage units 230 are shown in FIG. 1, it will be appreciated that the aircraft 100 can include more or less than two units. The electric energy storage units 230 can be configured as one or more batteries, such as one or more lithium-ion batteries, or alternatively may be configured as any other suitable electrical energy storage devices, such as supercapacitors.

In some alternative embodiments, the propulsion system 150 need not include the one or more electric energy storage units 230. In such embodiments, electrical power generated by the electric generator 220 of the turbo-generator 200 can be provided directly to the electric machines 164, 174, 184, 194 without being stored in one or more of electric energy storage units. In yet other alternative embodiments, the propulsion system 150 can be a fully electric propulsion system and need not include the turbo-generator 200. In such example embodiments, the electrical power source may be one or more electric energy storage units 230, such as a battery bank. In some embodiments, the fully electric propulsion system can include the electric generator 220 but not the gas turbine engine 210 of the turbo-generator 200. In such embodiments, the electric generator 220 may be operatively coupled with a passive torque source, such as a windmilling fan driven by an incoming airflow.

As further shown in FIGS. 1 and 2, the propulsion system 150 also includes a power management system having power electronics 238 and a power bus 242. The power electronics 238 can include one or more power converting devices, such as inverters, converters, etc. As will be appreciated, the power converting devices can include switching elements. In some embodiments, the power electronics 238 can include a bidirectional AC/DC and DC/AC converter. The power electronics 238 can also include a controller 240 operable to control the switching elements of the power converting devices. The electric machines 164, 174, 184, 194, the electric generator 220, the electric energy storage units 230, and the power electronics 238 are each electrically connectable to one another through one or more electric lines 244 of the power bus 242.

The controller 240 is configured to control the power converting devices so that electrical power can be distributed between the various components of the propulsion system 150. For example, the controller 240 may control the power converting devices to provide electrical power to, or draw electrical power from, the various components, such as the electric machines 164, 174, 184, 194 to operate the propulsion system 150 between various operating modes and perform various functions. Such is depicted schematically as the electric lines 244 of the power bus 242 extend through the controller 240 of the power electronics 238.

The controller 240 can form a part of a computing system 250 of the aircraft 100. The computing system 250 of the aircraft 100 can include one or more processors and one or more memory devices embodied in one or more computing devices. For instance, as depicted in FIG. 1, the computing system 250 can include controller 240 as well as other computing devices, such as computing device 252. The computing system 250 can include other computing devices as well, such as one or more controllers 254 associated with the turbo-generator 200. The computing devices of the computing system 250 can be communicatively coupled with one another via a communication network 256. The communication network 256 can include one or more wired or wireless communication links for communicatively coupling the devices and machines of the computing system 250 as well as other controllable devices of the aircraft 100.

The computing devices of the computing system 250 of the aircraft 100 may be configured in substantially the same manner as the exemplary computing devices of the computing system 500 described below with reference to FIG. 17 and may be configured to perform one or more of the functions of the exemplary method (400) described below.

The aircraft 100 can also include a plurality of sensors for sensing various operating conditions associated with the aircraft 100. The plurality of sensors are represented schematically in FIG. 1 by sensor 258. The sensors can be communicatively coupled with one or more of the computing devices of the computing system 250. For instance, the aircraft 100 can include an Inertial Measurement Unit (IMU) operable to sense an orientation of the aircraft 100. The IMU can include one or more accelerometers, one or more gyroscopes, and in some embodiments, one or more magnetometers. The sensed orientation of the aircraft 100 can be provided to the computing devices of the computing system 250 of the aircraft 100. The aircraft 100 can include other sensors as well, such as airspeed sensors, temperature sensors, pressure sensors, altitude sensors, weight sensors, sensors for recording ambient conditions, and the like. Further, in some embodiments, the aircraft 100 can include one or more imaging devices, represented schematically in FIG. 1 by imaging device 255. In some embodiments, the imaging device can be a camera operable to take still photos and/or video, for example. In yet other embodiments, the imaging device can be an infrared camera. Data captured by the one or more imaging devices can be used in addition or alternatively to the IMU to determine the orientation of the aircraft 100.

Sensor data, which can include data received by the one or more sensors 258 and imaging data from the one or more imaging devices 255, can be provided to the one or more processors of the computing system 250. Knowing the orientation of the aircraft 100 as well as other information associated with the aircraft 100, such as the aircraft center of mass, the configuration of the aircraft, the current weight of the aircraft, ambient conditions, etc., one or more processors of the computing system 250 can cause the propulsors 160, 170, 180, 190 of the aircraft 100 to produce certain amounts of thrust, particularly during a flight orientation transition as will be explained below.

Figure 4:
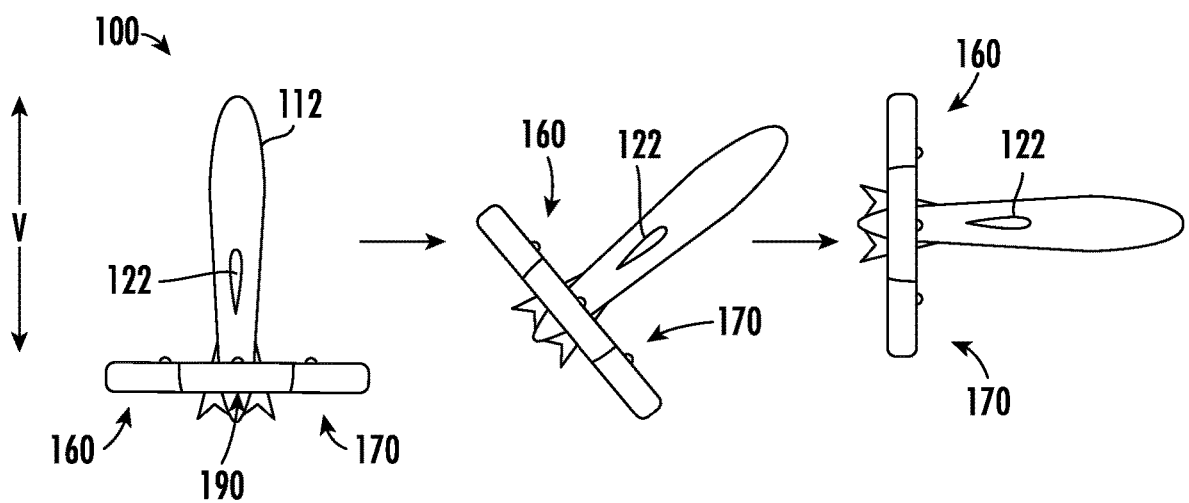
FIG. 4 provides a schematic view of the aircraft of FIG. 1 transitioning from a vertical orientation to a horizontal orientation.
Figure 10:
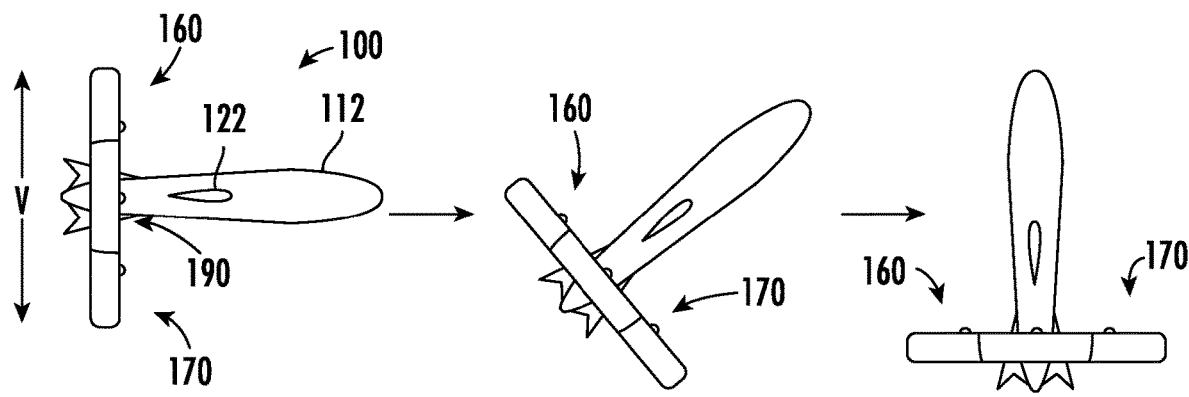
FIG. 10 provides a schematic view of the aircraft of FIG. 1 transitioning from a horizontal orientation to a vertical orientation.

Example manners in which the aircraft 100 may perform a flight orientation transition will now be provided. Generally, for the tail-sitter aircraft 100, there are two primary types of flight orientation transitions, including a vertical-to-horizontal flight transition, e.g., as shown in FIG. 4, and a horizontal-to-vertical flight transition, e.g., as shown in FIG. 10. Generally, to perform a flight orientation transition, one or more processors of the computing system 250 of the aircraft 100 are configured to cause, in response to a demand to change an orientation of the aircraft for a flight orientation transition, the fan 162 of the first propulsor 160 and the fan 172 of the second propulsor 170 to produce different amounts of the thrust with respect to one another so that the aircraft 100 performs the flight orientation transition. Stated another way, the first propulsor 160 and the second propulsor 170 can be individually controlled to produce different amounts of thrust with respect to one another, which results in a thrust differential. By controlling the propulsors 160, 170 to produce a thrust differential, or different amounts of thrust, the aircraft 100 can transition to a different flight orientation in a controlled manner.

With reference to FIGS. 1, 2, 3, 4, and 5, an example manner in which the aircraft 100 may perform a vertical-to-horizontal orientation transition will be provided. A vertical-to-horizontal orientation transition may be performed after the aircraft 100 has gained sufficient altitude after takeoff and it is desired to transition to cruise flight, for example.

One or more processors of the computing system 250 of the aircraft 100 can receive a demand to change an orientation of the aircraft 100 for a flight orientation transition. Particularly, for this example, the one or more processors of the computing system 250 can receive a demand 260 to change an orientation of the aircraft 100 for a flight orientation transition. As one example, the one or more processors of the computing system 250 can receive the demand 260 in response to a pilot input, e.g., in response to a pilot manipulation of a button, yoke, or joystick. The pilot may be onboard manning the aircraft 100 or offboard manning the aircraft 100 from a remote pilot station. For instance, after the aircraft 100 has gained sufficient altitude after takeoff, during which the aircraft 100 is vertically-oriented, the pilot can manipulate a control to command or indicate that the aircraft 100 is to transition from a vertical orientation to a horizontal orientation.

As another example, the one or more processors of the computing system 250 can receive the demand 260 in response to a trigger condition. For instance, after the aircraft 100 has taken off and reached a predetermined altitude, the one or more processors of the computing system 250 can automatically command or indicate that the aircraft 100 is to transition from a vertical orientation to a horizontal orientation. In some instances, the predetermined altitude at which the flight orientation transition is triggered may vary based on one or more factors, such as wind conditions, the geographic area in which the aircraft 100 is flying (e.g., city or rural area), the surrounding terrain (e.g., mountainous or flat), etc. Other trigger conditions in addition or alternatively to reaching a predetermined altitude are possible.

The one or more processors of the computing system 250 can receive data 270 indicating operating conditions associated with the aircraft 100. For instance, the data 270 can include values for various parameters, such as altitude, ambient conditions, aircraft orientation, aircraft weight, etc. The values can be sensed values, calculated values, or a combination thereof. The values can be based on outputs from the sensors 258 of the aircraft 100, for example. The data 270 can also include other information, such as information indicating the geographic location in which the aircraft 100 is currently flying, weather information, aircraft configuration information, the current electrical power stored onboard, etc.

The data 270 can be utilized by the pilot and/or computing system 250 to trigger the demand 260 that the aircraft 100 is to perform a flight orientation transition. For instance, based on the altitude reading, the current weight of the aircraft 100, and the current wind conditions received as part of the data 270, the one or more processors of the computing system 250 can automatically trigger the demand 260 that the aircraft 100 is to perform a flight orientation transition.

Under one example control scheme, the aircraft 100 can be transitioned from a vertical orientation to a horizontal orientation automatically based on a transition schedule 280. Particularly, the one or more processors of the computing system 250 of the aircraft 100 can determine a transition schedule 280 based at least in part on the demand 260 and the received data 270. The transition schedule 280 indicates how the first and second propulsors 160, 170, and in some embodiments the third and fourth propulsors 180, 190, are to be controlled during the flight orientation transition. The demand 260 can trigger the one or more processors of the computing system 250 to generate transition schedule 280 and the received data 270 can be used to determine how the propulsors 160, 170, 180, 190 are to be controlled during the flight orientation transition.

As one example, the manner in which the propulsors 160, 170, 180, 190 are controlled on a windy day may differ from the manner in which they are controlled on a calm day. In this manner, wind conditions may determine how the transition schedule 280 is determined. As another example, the manner in which the propulsors 160, 170, 180, 190 are controlled at a particular altitude may differ from the manner in which they are controlled at a different altitude. In this manner, altitude may determine how the transition schedule 280 is determined. In yet another example, the manner in which the propulsors 160, 170, 180, 190 are controlled when the aircraft 100 is flying over a city may differ from the manner in which they are controlled when the aircraft 100 is flying over a rural area. In this manner, the geographic location over which the aircraft 100 is flying may determine how the transition schedule 280 is determined. It will be appreciated that, in addition or alternatively to wind conditions, altitude, and the geographic location over which the aircraft 100 is flying, other conditions or factors may be considered in determining the transition schedule 280. For instance, such considerations can include, without limitation, whether the aircraft 100 is manned or unmanned, the weight of the aircraft 100, the health of the propulsors 160, 170, 180, 190 or some components thereof, some combination of the foregoing, etc.

Generally, the transition schedule 280 for a vertical-to-horizontal flight transition is determined based at least in part on the received data 270 so that the first propulsor 160 is caused to produce more thrust than the second propulsor 170. For instance, as shown schematically in FIG. 3 by the right-to-left diagonal lines associated with the fan 162 and the left-to-right diagonal lines associated with the fan 172, the fan 162 of the first propulsor 160 is shown producing more thrust than the fan 172 of the second propulsor 170 in accordance with the transition schedule 280. The thrust differential created by the differing thrust outputs of the propulsors 160, 170 may provide a sufficient moment to change the orientation of the aircraft 100 from a vertical orientation to a horizontal orientation, e.g., as shown in FIG. 4.

The one or more processors of the computing system 250 can generate one or more commands 290 in accordance with the transition schedule 280. Based at least in part on the generated commands 290, the one or more processors of the computing system 250 can cause more or less electrical power to be provided to the electric machines 164, 174, 184, 194. This changes the speed of the electric machines 164, 174, 184, 194 and ultimately the speed of their associated fans 162, 172, 182, 192. For instance, based on the one or more generated commands 290, the controller 240 may command the power electronics of the power bus 242 to control the electrical power provided to the electric machines 164, 174, 184, 194 so that they can drive their respective fans 162, 172, 182, 192 to ultimately transition the aircraft 100 from the vertical orientation to the horizontal orientation. The electrical power provided to the electric machines 164, 174, 184, 194 can be routed from the electric generator 220 thereto and/or drawn from the electric energy storage units 230.

Figures 5, 6:
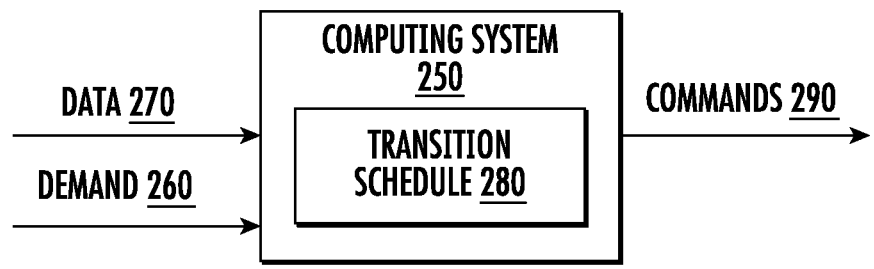
FIG. 5 provides a system diagram of an example computing system of the aircraft of FIG. 1.
FIG. 6 provides an example transition schedule generated by the computing system of FIG. 5.

With reference to FIG. 6 in addition to FIGS. 1 through 5, an example transition schedule 280 is provided. For the example transition schedule 280 depicted, the propulsors 160, 170, 180, 190 are controlled according to rotational speed. Particularly, the percent values in the transition schedule 280 represent the percent of maximum rotational speed demanded of the electric machines 164, 174, 184, 194. In other embodiments, the percent values in the transition schedule 280 may represent the percent of maximum rotational speed demanded of the fans 162, 172, 182, 192. In other embodiments, other parameters besides speed can be used as the control parameter. This example assumes that the electric machines 164, 174, 184, 194 have the same maximum rated speed. However, in other embodiments, the electric machines 164, 174, 184, 194 may not have the same maximum rated speed.

As depicted, the transition schedule 280 includes an orientation transition section that is segmented into segments, including a first segment S1, a second segment S2, and a third segment S3. It will be appreciated that the orientation transition section of the transition schedule 280 may have more or less than three segments in other example embodiments. Also depicted in the transition schedule 280 is a takeoff section and a cruise section for reference. The takeoff section, the segments S1, S2, and S3, and the cruise section are sequentially arranged by time.

For this example, each propulsor 160, 170, 180, 190 is controlled during takeoff so that their associated electric machines 164, 174, 184, 194 are operated at 90% of their respective maximum rated speeds. In this regard, their respective fans 162, 172, 182, 192 produce the same amount or nearly the same amount of thrust, and as the aircraft 100 is vertically oriented during takeoff, the aircraft 100 climbs in altitude. Upon receiving the demand 260 that the aircraft 100 is to perform a vertical-to-horizontal orientation transition and the data 270, the one or more processors can generate the transition schedule 280, which can include the orientation transition section, and optionally, the takeoff and cruise sections.

For the transition schedule 280 depicted in FIG. 6, as noted above, the orientation transition is to occur in three segments, including the first segment S1, the second segment S2, and the third segment S3. In the first segment S1, the rotational speed of the electric machine 164 of the first propulsor 160 is scheduled to remain at 90% of its maximum rated speed. Thus, the electrical power provided to the electric machine 164 remains constant when the aircraft 100 transitions from the takeoff section to the first segment S1 of the orientation transition section of the transition schedule 280. However, notably, the rotational speed of the electric machine 174 of the second propulsor 170 is scheduled to decrease from 90% at takeoff to 45% of its maximum rated speed. Thus, the electrical power provided to the electric machine 174 is decreased (e.g., by 50%) when the aircraft 100 transitions from the takeoff section to the first segment S1 of the orientation transition section of the transition schedule 280.

The rotational speed of the electric machines 184, 194 of the third and fourth propulsors 180, 190 are also scheduled to decrease from 90% at takeoff to 80% of their respective maximum rated speeds. Thus, the electrical power provided to the electric machines 184, 194 is decreased when the aircraft 100 transitions from the takeoff section to the first segment S1 of the orientation transition section of the transition schedule 280. However, in other embodiments, the rotational speed of the electric machines 184, 194 of the third and fourth propulsors 180, 190 can be increased or decreased, e.g., depending on one or more factors, such as wind conditions, the weight of the aircraft 100, the current altitude of the aircraft 100, etc.

Accordingly, during the first segment S1 of the orientation transition, the difference in speed demanded of the electric machines 164, 174 and thus the electrical power provided thereto is relatively significant. The differential in provided electrical power causes the fans 162, 172 to rotate at different speeds, with the fan 162 of the first propulsor 160 rotating at a faster rotational speed than the fan 172 of the second propulsor 170. This results in a thrust differential, which creates a large moment on the aircraft 100. Consequently, the whole aircraft 100 begins to tilt over. In some embodiments, the first and second propulsors 160, 170 are controlled so that the first propulsor 160 outputs at least 25% more thrust than the second propulsor 170 during a vertical-to-horizontal flight transition, e.g., during the first segment S1 of the transition. In yet other embodiments, the first and second propulsors 160, 170 are controlled so that the first propulsor 160 outputs at least 50% more thrust than the second propulsor 170 during a vertical-to-horizontal flight transition, e.g., during the first segment S1 of the transition.

As the aircraft 100 begins to tilt or transition its orientation, the second segment S2 of the transition schedule 280 is implemented. That is, after the time period associated with the first segment S1 expires, or in some embodiments, after the aircraft 100 reaches a predetermined orientation, the second segment S2 of the orientation transition section is implemented. In some embodiments, the time period associated with the first segment S1 is shorter in time than the second and third segments S2, S3. In the second segment S2, the rotational speed of the electric machine 164 of the first propulsor 160 is scheduled to decrease from 90% during segment S1 to 85% of its maximum rated speed at the second segment S2. Thus, the electrical power provided to the electric machine 164 decreases, which consequently decreases the speed of its associated fan 162.

Further, in the second segment S2, the rotational speed of the electric machine 174 of the second propulsor 170 is scheduled to increase from 45% during segment S1 to 60% of its maximum rated speed at the second segment S2. Thus, the electrical power provided to the electric machine 174 increases, which increases the speed of its associated fan 172. As the fan 162 decreases in speed and the fan 172 increases in speed, the thrust differential produced is less than it was during the first segment S1. This slows the tilting or orientation transition of the aircraft 100. The rotational speed of the electric machines 184, 194 of the third and fourth propulsors 180, 190 are scheduled to remain constant at 80% during the second segment S2. This may facilitate stabilization of the aircraft 100 during the orientation transition.

As the aircraft 100 continues to tilt or transition its flight orientation to the horizontal orientation, the third segment S3 of the transition schedule 280 is implemented. That is, after the time period associated with the second segment S2 expires, or in some embodiments, after the aircraft 100 reaches a second predetermined orientation, the third segment S3 of the orientation transition section is implemented. In the third segment S3, the rotational speed of the electric machine 164 of the first propulsor 160 is scheduled to decrease from 85% during second segment S2 to 80% of its maximum rated speed at the third segment S3. Thus, the electrical power provided to the electric machine 164 decreases once again, which consequently further decreases the speed of its associated fan 162. Moreover, the rotational speed of the electric machine 174 of the second propulsor 170 is scheduled to increase from 60% during the second segment S2 to 75% of its maximum rated speed at the third segment S3. Thus, the electrical power provided to the electric machine 174 increases once again, which further increases the speed of its associated fan 172. As the fan 162 decreases in speed and the fan 172 increases in speed during the third segment S3, the thrust differential produced is less than it was during the second segment S2. This further slows the tilting or orientation transition of the aircraft 100. The rotational speed of the electric machines 184, 194 of the third and fourth propulsors 180, 190 are scheduled to remain constant at 80% during the third segment S3. This may continue to facilitate stabilization of the aircraft 100 during the orientation transition.

By implementing the first, second, and third segments S1, S2, S3 of the orientation transition section of the transition schedule 280, the aircraft 100 can transition automatically in a controlled manner from the vertical orientation to the horizontal orientation, e.g., as shown in FIG. 4. After transitioning to the horizontal orientation, the cruise section of the transition schedule 280 can be implemented.

Although the control scheme provided above implements an automatic transition of the aircraft 100 according to a determined transition schedule, it will be appreciated that the propulsors 160, 170 may be independently controlled in accordance with other example control schemes as well. For instance, in some embodiments, the aircraft 100 can be transitioned manually, e.g., by a series of pilot inputs. As one example, the aircraft 100 can be transitioned manually in accordance with an open-loop control scheme. The one or more processors of the computing system 250 can cause the propulsors 160, 170 to produce a thrust differential to transition the aircraft 100 manually according to an open-loop control scheme as set forth below.

Figure 7:
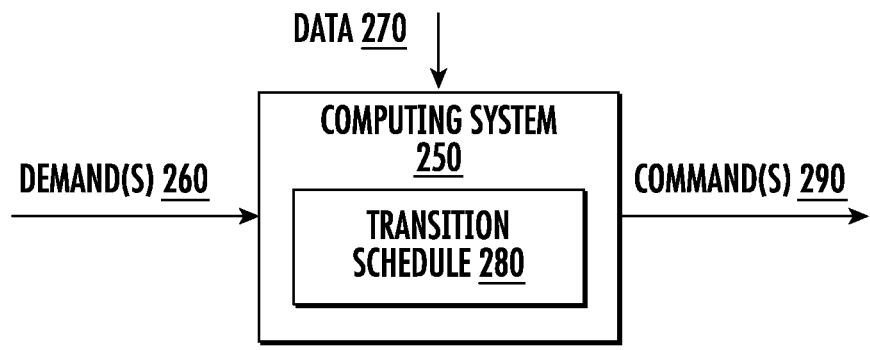
FIG. 7 provides a system diagram of the computing system of the aircraft of FIG. 1 implementing an open-loop control scheme.

With reference to FIG. 7 in addition to FIGS. 1 through 4, a system diagram depicting an open-loop control scheme is provided. Under the open-loop control scheme, the one or more processors of the computing system 250 can receive a demand 260, which may be series of demands, to change an orientation of the aircraft 100 for the flight orientation transition. The thrust outputs of the first and second propulsors 160, 170, and in some embodiments, the third and fourth propulsors 180, 190, can be continuously controlled throughout the transition based at least in part on demands 260. Each demand 260 may correspond with a demanded orientation of the aircraft 100. The demanded orientation can be controlled by a pilot throughout the transition, e.g., by a pilot manipulating a yoke or joystick.

For each given demanded orientation or demand 260, electrical power can be provided to the electric machines 164, 174, 184, 194 in accordance with a transition schedule 280. In this way, the first and second propulsors 160, 170 can be controlled to produce a thrust differential that ultimately allows the aircraft 100 to transition from a vertical orientation to a horizontal orientation. The transition schedule 280 can be constructed in a similar manner to the transition schedule 280 of FIG. 6, for example.

In some embodiments, the transition schedule 280 used for controlling the propulsors 160, 170, 180, 190 in the vertical-to-horizontal flight transition can be selected from a plurality of predetermined schedules. Each of the plurality of schedules can correspond with a set of operating conditions. For instance, a first schedule can correspond to a first set of operating conditions, a second schedule can correspond to a second set of operating conditions, and so forth. The schedule selected for use can be selected based on the operating conditions associated with the aircraft 100, which can be determined based on the received data 270. The schedule can be selected based on being a closet match to one of the plurality of schedules, for example. The one or more processors of the computing system 250 can generate one or more commands 290. Based on the commands 290, the first and second propulsors 160, 170 can be controlled to produce a thrust differential that ultimately allows the aircraft 100 to transition from a vertical orientation to a horizontal orientation. It will be appreciated that the open-loop control scheme of FIG. 7 is provided by way of example only and that other open-loop control schemes are possible.

As another example, the aircraft 100 can be transitioned manually in accordance with a closed-loop control scheme. The one or more processors of the computing system 250 can cause the propulsors 160, 170 to produce a thrust differential to transition the aircraft 100 according to a closed-loop control scheme as set forth below.

Figure 8:
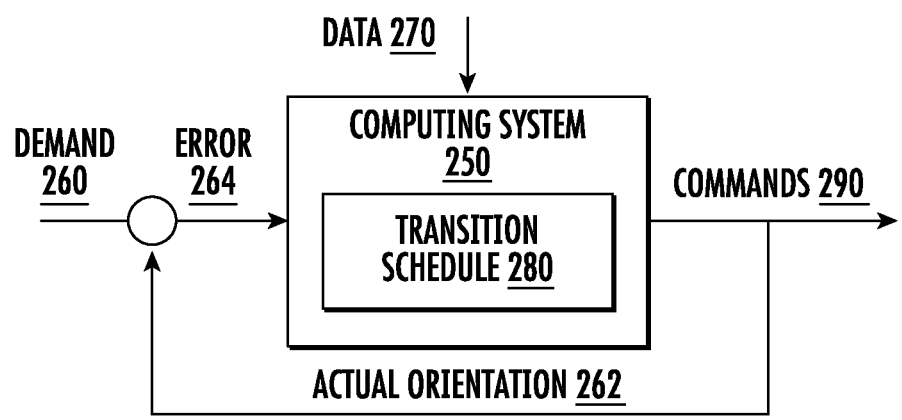
FIG. 8 provides a system diagram of the computing system of the aircraft of FIG. 1 implementing a closed-loop control scheme.
Figure 9:
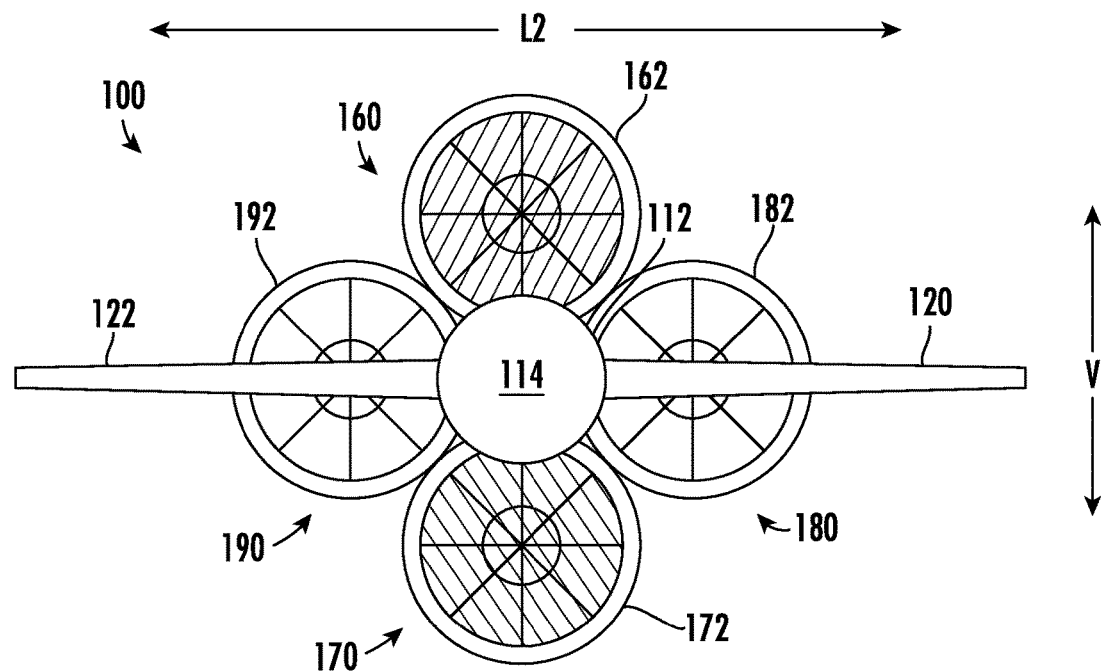
FIG. 9 provides a schematic forward-looking-aft view of the aircraft of FIG. 1 depicting the aircraft transitioning from a horizontal orientation to a vertical orientation.

With reference to FIG. 8 in addition to FIGS. 1 through 4, a system diagram depicting a closed-loop control scheme is provided. Under the closed-loop control scheme, the one or more processors of the computing system 250 can receive a demand 260, which may be series of demands, to change an orientation of the aircraft 100 for the flight orientation transition. The thrust outputs of the first and second propulsors 160, 170, and in some embodiments, the third and fourth propulsors 180, 190, can be continuously controlled throughout the transition based at least in part on demands 260. Each demand 260 may correspond with a demanded orientation of the aircraft 100. The demanded orientation can be controlled by a pilot throughout the transition, e.g., by a pilot manipulating a yoke or joystick.

As depicted in FIG. 8, the actual orientation 262 of the aircraft 100, e.g., as provided by an IMU and/or imaging device, can be fed back into the loop. The one or more processors of the computing system 250 can compare the actual orientation 262 to the demanded orientation as set forth in the last received demand 260. Based on this comparison, the one or more processors of the computing system 250 can determine a difference or error 264 between the demanded orientation as set forth in the last received demand 260 and the actual orientation 262.

Based on the determined error 264, the one or more processors of the computing system 250 can access a transition schedule 280 to determine the manner in which the first and second propulsors 160, 170 are to be controlled to produce a thrust differential that ultimately transitions the aircraft 100 to reduce the error 264. The transition schedule 280 can be similarly constructed as the one depicted in FIG. 6. For instance, in accessing the transition schedule 280, the one or more processors can determine the percent of maximum rotational speed demanded of the electric machines 164, 174, 184, 194 that would ultimately move the aircraft 100 so that the error 264 is reduced. Particularly, the percent of maximum rotational speed demanded of the electric machines 164, 174, 184, 194 that correspond with the determined error 264 are determined by accessing the transition schedule 280, and based on the determined percent of maximum rotational speed demanded of the electric machines 164, 174, 184, 194 that correspond with the determined error 264, one or commands 290 are generated by the one or more processors of the computing system 250. An amount of electrical current can be provided to the electric machines 164, 174, 184, 194 in accordance with the commands 290 so that the first and second propulsors 160, 170 to produce a thrust differential so that the actual orientation of the aircraft 100 meets the demanded orientation of the aircraft 100, and ultimately, so that the aircraft 100 transitions from a vertical orientation to a horizontal orientation.

In some embodiments, the transition schedule used for controlling the propulsors 160, 170, 180, 190 in the vertical-to-horizontal flight transition can be selected from a plurality of predetermined schedules. Each of the plurality of schedules can correspond with a set of operating conditions. For instance, a first schedule can correspond to a first set of operating conditions, a second schedule can correspond to a second set of operating conditions, and so forth. The schedule selected for use can be selected based on the operating conditions associated with the aircraft 100, which can be determined based on the received data 270. The schedule can be selected based on being a closet match to one of the plurality of schedules, for example. It will be appreciated that the closed-loop control scheme of FIG. 8 is provided by way of example only and that other closed-loop control schemes are possible.

With reference to FIGS. 1, 2, 9, 10, and 11, an example manner in which the aircraft 100 may perform a horizontal-to-vertical orientation transition will be provided in detail. A horizontal-to-vertical orientation transition may be performed when it is desired to land the aircraft 100 after flying in cruise flight, for example.

The one or more processors of the computing system 250 of the aircraft 100 can receive a demand to change an orientation of the aircraft 100 for a flight orientation transition. Particularly, for this example, the one or more processors of the computing system 250 can receive a demand 360 to change an orientation of the aircraft 100 for a horizontal-to-vertical orientation transition. As one example, the one or more processors of the computing system 250 can receive the demand 360 in response to a pilot input, e.g., as described above. As another example, the one or more processors of the computing system 250 can receive the demand 360 in response to a trigger condition, such as when the aircraft 100 is within a predetermined range of the target landing point. For instance, once the aircraft 100 is within a predetermined range of the target landing point, the one or more processors of the computing system 250 can automatically command or indicate that the aircraft 100 is to transition from a horizontal orientation to a vertical orientation, e.g., for landing. Other trigger conditions in addition or alternatively to being within a predetermined range of the target landing point are possible.

The one or more processors of the computing system 250 can receive data 370 indicating operating conditions associated with the aircraft 100. For instance, the data 370 can include values for various parameters, such as altitude, ambient conditions, aircraft orientation, aircraft weight, etc. The values can be sensed values, calculated values, or a combination thereof. The values can be based on outputs from the sensors 258 of the aircraft 100, for example. The data 370 can also include other information, such as information indicating the geographic location in which the aircraft 100 is currently flying, weather information, aircraft configuration information, the current electrical power stored onboard, the target landing point, information from an air traffic control, etc.

The data 370 can be utilized by the pilot and/or computing system 250 to trigger the demand 360 that the aircraft 100 is to perform a flight orientation transition. For instance, based on the current ambient conditions, the target landing point, and the current weight of the aircraft 100 received as part of the data 370, the one or more processors of the computing system 250 can automatically trigger the demand 360 that the aircraft 100 is to perform the horizontal-to-vertical orientation transition.

Under one example control scheme, the aircraft 100 can be transitioned from a horizontal orientation to a vertical orientation automatically based on a transition schedule 380. Particularly, the one or more processors of the computing system 250 of the aircraft 100 can determine the transition schedule 380 based at least in part on the demand 360 and the received data 370. The transition schedule 380 indicates how the first and second propulsors 160, 170, and in some embodiments the third and fourth propulsors 180, 190, are to be controlled during the flight orientation transition. The demand 360 can trigger the one or more processors of the computing system 250 to generate transition schedule 380 and the received data 370 can be used to determine how the propulsors 160, 170, 180, 190 are to be controlled during the flight orientation transition.

Various conditions and/or factors may be considered in determining the transition schedule 380, which ultimately sets the schedule for how the propulsors 160, 170, 180, 190 are to be controlled during the flight orientation transition. Example conditions and/or factors may include, without limitation, wind conditions, altitude, the distance between a current position of the aircraft 100 and a target landing point, the geographic location over which the aircraft 100 is flying, whether the aircraft 100 is manned or unmanned, the weight of the aircraft 100, the health of the propulsors 160, 170, 180, 190 or some components thereof, some combination of the foregoing, etc.

Generally, the transition schedule 380 for a horizontal-to-vertical flight transition is determined based at least in part on the received data 370 so that the second propulsor 170 is caused to produce more thrust than the first propulsor 160. For instance, as shown schematically in FIG. 9 by the left-to-right diagonal lines associated with the fan 162 and the right-to-left diagonal lines associated with the fan 172, the fan 172 of the second propulsor 170 is shown producing more thrust than the fan 162 of the first propulsor 160 in accordance with the transition schedule 380. The thrust differential created by the differing thrust outputs of the propulsors 160, 170 may provide a sufficient moment to change the orientation of the aircraft 100 from a horizontal orientation to a vertical orientation, e.g., as shown in FIG. 10.

The one or more processors of the computing system 250 can generate one or more commands 390 in accordance with the transition schedule 380. Based at least in part on the generated commands 390, the one or more processors of the computing system 250 can cause more or less electrical power to be provided to the electric machines 164, 174, 184, 194. As noted previously, this changes the speed of the electric machines 164, 174, 184, 194 and ultimately the speed of their associated fans 162, 172, 182, 192. For instance, based on the one or more generated commands 390, the controller 240 may command the power electronics of the power bus 242 to control the electrical power provided to the electric machines 164, 174, 184, 194 so that they can drive their respective fans 162, 172, 182, 192 to ultimately transition the aircraft 100 from the horizontal orientation to the vertical orientation. The electrical power provided to the electric machines 164, 174, 184, 194 can routed from the electric generator 220 thereto and/or drawn from the electric energy storage units 230.

Figures 11, 12, 13:
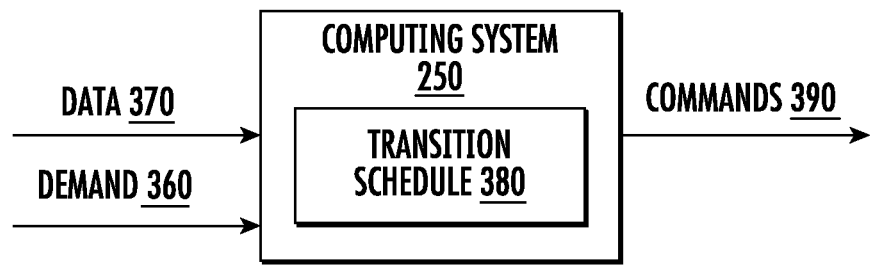
FIG. 11 provides another system diagram of the computing system of the aircraft of FIG. 1.
FIG. 12 provides an example transition schedule generated by the computing system of FIG. 11.
FIG. 13 provides another example transition schedule that can be generated by the computing system of FIG. 11.

With reference to FIG. 12 in addition to FIGS. 1, 2, 9, 10, and 11, an example transition schedule 380 is provided. For the example transition schedule 380 depicted, the propulsors 160, 170, 180, 190 are controlled according to rotational speed. Particularly, the percent values in the transition schedule 380 represent the percent of maximum rotational speed demanded of the electric machines 164, 174, 184, 194. In other embodiments, the percent values in the transition schedule 380 may represent the percent of maximum rotational speed demanded of the fans 162, 172, 182, 192. In other embodiments, other parameters besides speed can be used as the control parameter. This example assumes that the electric machines 164, 174, 184, 194 have the same maximum rated speed.

As depicted, the transition schedule 380 includes an orientation transition section that is segmented into segments, including a first segment S1, a second segment S2, and a third segment S3. It will be appreciated that the orientation transition section of the transition schedule 380 may have more or less than three segments in other example embodiments. Also depicted in the transition schedule 380 is a cruise section and a landing section for reference. The cruise section, the segments S1, S2, and S3, and the landing section are sequentially arranged by time.

For this example, each propulsor 160, 170, 180, 190 is controlled during cruise so that their associated electric machines 164, 174, 184, 194 are operated at 80% of their respective maximum rated speeds. In this regard, their respective fans 162, 172, 182, 192 produce the same amount or nearly the same amount of thrust. It will be appreciated that the electric machines 164, 174, 184, 194 can be controlled in a different manner during cruise flight. Upon receiving the demand 360 that the aircraft 100 is to perform a horizontal-to-vertical orientation transition and the data 370, the one or more processors can generate the transition schedule 380, which can include the orientation transition section, and optionally, the cruise and landing sections.

For the transition schedule 380 depicted in FIG. 12, the orientation transition is to occur in three segments, including the first segment S1, the second segment S2, and the third segment S3. In the first segment S1, notably, the rotational speed of the electric machine 164 of the first propulsor 160 is scheduled to significantly decrease from 80% at cruise to 35% of its maximum rated speed. Thus, the electrical power provided to the electric machine 164 is decreased (e.g., by greater than 50%) when the aircraft 100 transitions from the cruise section to the first segment S1 of the orientation transition section of the transition schedule 380. Further, in the first segment S1, the rotational speed of the electric machine 174 of the second propulsor 170 is scheduled to increase from 80% at cruise to 85% of its maximum rated speed. Thus, the electrical power provided to the electric machine 174 is increased when the aircraft 100 transitions from the cruise section to the first segment S1 of the orientation transition section of the transition schedule 380. The rotational speed of the electric machines 184, 194 of the third and fourth propulsors 180, 190 are also scheduled to remain constant when the aircraft 100 transitions from the cruise section to the first segment S1 of the orientation transition section. However, in other embodiments, the rotational speed of the electric machines 184, 194 of the third and fourth propulsors 180, 190 can be increased or decreased, e.g., depending on one or more factors, such as wind conditions, the weight of the aircraft 100, the current altitude of the aircraft 100, etc.

Accordingly, during the first segment S1 of the orientation transition, the difference in speed demanded of the electric machines 164, 174 and thus the electrical power provided thereto is relatively significant. The differential in provided electrical power causes the fans 162, 172 to rotate at different speeds, with the fan 172 of the second propulsor 170 rotating at a faster rotational speed than the fan 162 of the first propulsor 160. This results in a thrust differential, which creates a large moment on the aircraft 100. Consequently, the whole aircraft 100 begins to tilt from its horizontal orientation to a vertical orientation.

In some embodiments, the first and second propulsors 160, 170 are controlled so that the second propulsor 170 outputs at least 25% more thrust than the first propulsor 160 during a horizontal-to-vertical flight transition, e.g., during the first segment S1 of the transition. In yet other embodiments, the first and second propulsors 160, 170 are controlled so that the second propulsor 170 outputs at least 50% more thrust than the first propulsor 160 during a horizontal-to-vertical flight transition, e.g., during the first segment S1 of the transition. In some further embodiments, the first and second propulsors 160, 170 are controlled so that the second propulsor 170 outputs at least 75% more thrust than the first propulsor 160 during a horizontal-to-vertical flight transition, e.g., during the first segment S1 of the transition. In addition, in some embodiments, the first and second propulsors 160, 170 can be controlled so that the second propulsor 170 outputs an amount of thrust and so that the electric machine 164 associated with the first propulsor 160 is controlled not to drive the fan 162 during a horizontal-to-vertical flight transition, e.g., during the first segment S1 of the transition. In such embodiments, electrical power can cease being provided to the electric machine 164, e.g., during the first segment S1.

As the aircraft 100 begins to tilt or transition to a more vertical orientation, the second segment S2 of the transition schedule 380 is implemented. That is, after the time period associated with the first segment S1 expires, or in some embodiments, after the aircraft 100 reaches a predetermined orientation, the second segment S2 of the orientation transition section is implemented. In some embodiments, the time period associated with the first segment S1 is shorter in time than the second and third segments S2, S3. In the second segment S2, the rotational speed of the electric machine 164 of the first propulsor 160 is scheduled to increase from 35% during segment S1 to 50% of its maximum rated speed at the second segment S2. Thus, the electrical power provided to the electric machine 164 increases, which consequently increases the speed of its associated fan 162.

Further, in the second segment S2, the rotational speed of the electric machine 174 of the second propulsor 170 is scheduled to increase from 85% during segment S1 to 90% of its maximum rated speed at the second segment S2. Thus, the electrical power provided to the electric machine 174 increases, which increases the speed of its associated fan 172. In the second segment S2, the thrust differential is less than it was during the first segment S1. This slows the tilting or orientation transition of the aircraft 100. The rotational speed of the electric machines 184, 194 of the third and fourth propulsors 180, 190 are scheduled to remain constant at 80% during the second segment S2. This may facilitate stabilization of the aircraft 100 during the orientation transition.

As the aircraft 100 continues to tilt or transition its flight orientation to the vertical orientation, the third segment S3 of the transition schedule 380 is implemented. That is, after the time period associated with the second segment S2 expires, or in some embodiments, after the aircraft 100 reaches a second predetermined orientation, the third segment S3 of the orientation transition section is implemented. In the third segment S3, the rotational speed of the electric machine 164 of the first propulsor 160 is scheduled to increase from 50% during the second segment S2 to 80% of its maximum rated speed at the third segment S3. Thus, the electrical power provided to the electric machine 164 increases once again, which consequently further increases the speed of its associated fan 162. Moreover, the rotational speed of the electric machine 174 of the second propulsor 170 is scheduled to remain constant at the third segment S3. Thus, the electrical power provided to the electric machine 174 remains constant or nearly constant, which maintains the speed of the fan 172. The thrust differential produced in the third segment S3 is less than it was during the second segment S2. This further slows the tilting or orientation transition of the aircraft 100. The rotational speed of the electric machines 184, 194 of the third and fourth propulsors 180, 190 are both scheduled to increase from 80% to 85% of their maximum rated speed during the third segment S3. This may provide additional thrust to stabilize the aircraft 100 during the orientation transition, particularly in view of the loss of lift provided by the wings 120, 122.

By implementing the first, second, and third segments S1, S2, S3 of the orientation transition section of the schedule 380, the aircraft 100 can automatically transition in a controlled manner from the horizontal orientation to the vertical orientation, e.g., as shown in FIG. 10. After transitioning to the vertical orientation, the landing section of the schedule 380 can be implemented. While in the vertical orientation, lift is provided by primarily by the propulsors 160, 170, 180, 190 as opposed to the lift being provided by the wings 120, 122 when the aircraft 100 is in the horizontal orientation.

With reference to FIG. 13 in addition to FIGS. 1, 2, 9, 10, and 11, another example transition schedule 380 is provided. For the example transition schedule 380 depicted in FIG. 13, the propulsors 160, 170, 180, 190 are controlled according to rotational speed. Particularly, the percent values in the transition schedule 380 represent the percent of maximum rotational speed demanded of the electric machines 164, 174, 184, 194. In other embodiments, the percent values in the transition schedule 380 may represent the percent of maximum rotational speed demanded of the fans 162, 172, 182, 192. In other embodiments, other parameters besides speed can be used as the control parameter. This example assumes that the electric machines 164, 174, 184, 194 have the same maximum rated speed.

As depicted in FIG. 13, the transition schedule 380 includes an orientation transition section that is segmented into segments, including a first segment S1, a second segment S2, and a third segment S3. It will be appreciated that the orientation transition section of the transition schedule 380 may have more or less than three segments in other example embodiments. Also depicted in the transition schedule 380 is a cruise section and a landing section for reference. The cruise section, the segments S1, S2, and S3, and the landing section are sequentially arranged by time.

For this example, each propulsor 160, 170, 180, 190 is controlled during cruise so that their associated electric machines 164, 174, 184, 194 are operated at 80% of their respective maximum rated speeds. In this regard, their respective fans 162, 172, 182, 192 produce the same amount or nearly the same amount of thrust. It will be appreciated that the electric machines 164, 174, 184, 194 can be controlled in a different manner during cruise flight. Upon receiving the demand 360 that the aircraft 100 is to perform a horizontal-to-vertical orientation transition and the data 370, the one or more processors can generate the transition schedule 380, which can include the orientation transition section, and optionally, the cruise and landing sections.

For the transition schedule 380 depicted in FIG. 13, the orientation transition is to occur in three segments, including the first segment S1, the second segment S2, and the third segment S3. In the first segment S1, notably, the rotational speed of the electric machine 164 of the first propulsor 160 is scheduled to remain at 80% of its maximum rated speed. Thus, the electrical power provided to the electric machine 164 is maintained constant or nearly constant when the aircraft 100 transitions from the cruise section to the first segment S1 of the orientation transition section of the transition schedule 380. Further, in the first segment S1, the rotational speed of the electric machine 174 of the second propulsor 170 is scheduled to increase from 80% at cruise to 100% of its maximum rated speed. Thus, the electrical power provided to the electric machine 174 is increased when the aircraft 100 transitions from the cruise section to the first segment S1 of the orientation transition section of the transition schedule 380. The rotational speed of the electric machines 184, 194 of the third and fourth propulsors 180, 190 are also scheduled to remain constant when the aircraft 100 transitions from the cruise section to the first segment S1 of the orientation transition section. However, in other embodiments, the rotational speed of the electric machines 184, 194 of the third and fourth propulsors 180, 190 can be increased or decreased, e.g., depending on one or more factors, such as wind conditions, the weight of the aircraft 100, the current altitude of the aircraft 100, etc.

Accordingly, during the first segment S1 of the orientation transition, the difference in speed demanded of the electric machines 164, 174 and thus the electrical power provided thereto is relatively significant. The differential in provided electrical power causes the fans 162, 172 to rotate at different speeds, with the fan 172 of the second propulsor 170 rotating at a faster rotational speed than the fan 162 of the first propulsor 160. This results in a thrust differential, which creates a large moment on the aircraft 100. Consequently, the whole aircraft 100 begins to tilt from its horizontal orientation to a vertical orientation. Notably, for the transition schedule 380 of FIG. 13, the thrust differential is created without decreasing the rotational speed of the fan 162 of the first propulsor 160. In this manner, more overall thrust can be generated, which may prevent the aircraft 100 from losing altitude during the flight transition, or at least reduce the altitude the aircraft 100 loses during the flight transition. In transitioning the aircraft 100 in a horizontal-to-vertical flight transition, gravity must be counteracted (as opposed to gravity assisting during a vertical-to-horizontal flight transition). Accordingly, in some instance, the transition schedule 380 can be determined so that both fans 162, 172 remain either constant or increase in rotational speed during the flight transition.

As the aircraft 100 begins to tilt or transition to a more vertical orientation, the second segment S2 of the transition schedule 380 is implemented. That is, after the time period associated with the first segment S1 expires, or in some embodiments, after the aircraft 100 reaches a predetermined orientation, the second segment S2 of the orientation transition section is implemented. In some embodiments, the time period associated with the first segment S1 is shorter in time than the second and third segments S2, S3. In the second segment S2, the rotational speed of the electric machine 164 of the first propulsor 160 is scheduled to remain constant at 80% of its maximum rated speed at the second segment S2. Thus, the electrical power provided to the electric machine 164 remains constant, which consequently keeps the speed of its associated fan 162 the same or nearly the same.

Further, in the second segment S2, the rotational speed of the electric machine 174 of the second propulsor 170 is scheduled to decrease from 100% during segment S1 to 95% of its maximum rated speed at the second segment S2. Thus, the electrical power provided to the electric machine 174 decreases, which decreases the speed of its associated fan 172. Thus, in the second segment S2, the thrust differential is less than it was during the first segment S1. This slows the tilting or orientation transition of the aircraft 100. The rotational speed of the electric machines 184, 194 of the third and fourth propulsors 180, 190 are scheduled to remain constant at 80% during the second segment S2. This may facilitate stabilization of the aircraft 100 during the orientation transition.

As the aircraft 100 continues to tilt or transition its flight orientation to the vertical orientation, the third segment S3 of the transition schedule 380 of FIG. 13 is implemented. That is, after the time period associated with the second segment S2 expires, or in some embodiments, after the aircraft 100 reaches a second predetermined orientation, the third segment S3 of the orientation transition section is implemented. In the third segment S3, the rotational speed of the electric machine 164 of the first propulsor 160 is scheduled to remain constant once again at 80% of its maximum rated speed at the third segment S3. Thus, the electrical power provided to the electric machine 164 remains constant once again, which consequently keeps the speed of its associated fan 162 the same or nearly the same. Moreover, the rotational speed of the electric machine 174 of the second propulsor 170 is scheduled to decrease from 95% at the second segment S2 to 90% of its maximum rated speed at the third segment S3. Thus, the electrical power provided to the electric machine 174 decreases, which decreases the speed of the fan 172. Thus, the thrust differential produced in the third segment S3 is less than it was during the second segment S2. This further slows the tilting or orientation transition of the aircraft 100. The rotational speed of the electric machines 184, 194 of the third and fourth propulsors 180, 190 are both scheduled to increase from 80% to 85% of their maximum rated speed during the third segment S3. This may provide additional thrust to stabilize the aircraft 100 during the orientation transition, particularly in view of the loss of lift provided by the wings 120, 122.

By implementing the first, second, and third segments S1, S2, S3 of the orientation transition section of the schedule 380 of FIG. 13, the aircraft 100 can automatically transition in a controlled manner from the horizontal orientation to the vertical orientation, e.g., as shown in FIG. 10. After transitioning to the vertical orientation, the landing section of the schedule 380 can be implemented. While in the vertical orientation, lift is provided by primarily by the propulsors 160, 170, 180, 190 as opposed to the lift being provided primarily by the wings 120, 122 when the aircraft 100 is in the horizontal orientation.

Although the control scheme provided above implements an automatic transition of the aircraft 100 according to a determined transition schedule, it will be appreciated that the propulsors 160, 170, and in some instances propulsors 180, 190 as well, may be independently controlled in accordance with other example control schemes. For instance, in some embodiments, the aircraft 100 can be transitioned manually from a horizontal orientation to a vertical orientation, e.g., by a series of pilot inputs. As one example, the aircraft 100 can be transitioned manually in accordance with an open-loop control scheme. The one or more processors of the computing system 250 can cause the propulsors 160, 170 to produce a thrust differential to transition the aircraft 100 manually according to an open-loop control scheme as set forth below.

Figure 14:
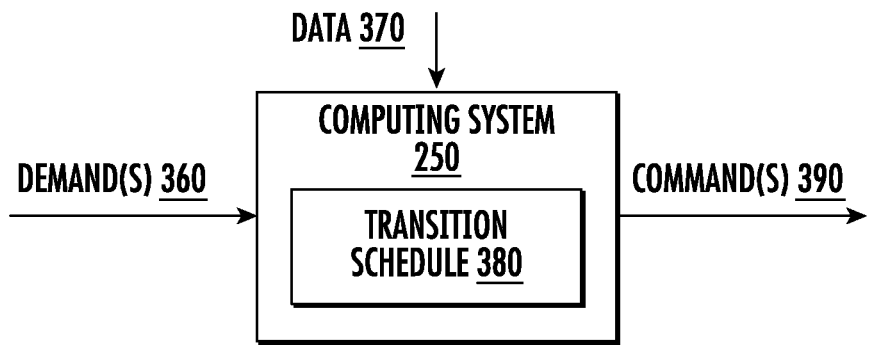
FIG. 14 provides a system diagram of the computing system of the aircraft of FIG. 1 implementing an open-loop control scheme.

With reference to FIG. 14 in addition to FIGS. 1, 2, 9, and 10, a system diagram depicting an open-loop control scheme is provided. Under the open-loop control scheme, the one or more processors of the computing system 250 can receive a demand 360, which may be series of demands, to change an orientation of the aircraft 100 for the flight orientation transition. The thrust outputs of the first and second propulsors 160, 170, and in some embodiments, the third and fourth propulsors 180, 190, can be continuously controlled throughout the transition based at least in part on demands 360. Each demand 360 may correspond with a demanded orientation of the aircraft 100. The demanded orientation can be controlled by a pilot throughout the transition, e.g., by a pilot manipulating a yoke or joystick.

For each given demanded orientation or demand 360, electrical power can be provided to the electric machines 164, 174, 184, 194 in accordance with a transition schedule 380. In this way, the first and second propulsors 160, 170 can be controlled to produce a thrust differential that ultimately allows the aircraft 100 to transition from a horizontal orientation to a vertical orientation. The transition schedule 380 can be constructed in a similar manner to the transition schedule 380 of FIG. 12, for example.

In some embodiments, the transition schedule 380 used for controlling the propulsors 160, 170, 180, 190 in the horizontal-to-vertical flight transition can be selected from a plurality of predetermined schedules. Each of the plurality of schedules can correspond with a set of operating conditions. For instance, a first schedule can correspond to a first set of operating conditions, a second schedule can correspond to a second set of operating conditions, and so forth. The schedule selected for use can be selected based on the operating conditions associated with the aircraft 100, which can be determined based on the received data 370. The schedule can be selected based on being a closet match to one of the plurality of schedules, for example. The one or more processors of the computing system 250 can generate one or more commands 390. Based on the commands 390, the first and second propulsors 160, 170 (and in some instances the propulsors 180, 190) can be controlled to produce a thrust differential that ultimately allows the aircraft 100 to transition from a horizontal orientation to a vertical orientation. It will be appreciated that the open-loop control scheme of FIG. 14 is provided by way of example only and that other open-loop control schemes are possible.

As another example, the aircraft 100 can be transitioned manually in accordance with a closed-loop control scheme. The one or more processors of the computing system 250 can cause the propulsors 160, 170 to produce a thrust differential to transition the aircraft 100 according to a closed-loop control scheme as set forth below.

Figure 15:
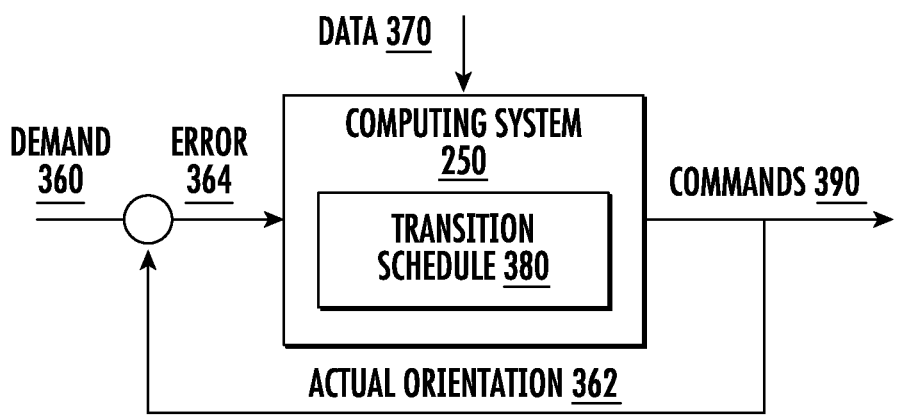
FIG. 15 provides a system diagram of the computing system of the aircraft of FIG. 1 implementing a closed-loop control scheme.

With reference to FIG. 15 in addition to FIGS. 1, 2, 9, and 10, a system diagram depicting a closed-loop control scheme is provided. Under the closed-loop control scheme, the one or more processors of the computing system 250 can receive a demand 360, which may be series of demands, to change an orientation of the aircraft 100 for the flight orientation transition. The thrust outputs of the first and second propulsors 160, 170, and in some embodiments, the third and fourth propulsors 180, 190, can be continuously controlled throughout the transition based at least in part on demands 360. Each demand 360 may correspond with a demanded orientation of the aircraft 100. The demanded orientation can be controlled by a pilot throughout the transition, e.g., by a pilot manipulating a yoke or joystick.

As depicted in FIG. 15, the actual orientation 362 of the aircraft 100, e.g., as provided by an IMU and/or an imaging device, can be fed back into the loop. The one or more processors of the computing system 250 can compare the actual orientation 362 to the demanded orientation as set forth in the last received demand 360. Based on this comparison, the one or more processors of the computing system 250 can determine a difference or error 364 between the demanded orientation as set forth in the last received demand 360 and the actual orientation 362.

Based on the determined error 364, the one or more processors of the computing system 250 can access a transition schedule 380 to determine the manner in which the first and second propulsors 160, 170 are to be controlled to produce a thrust differential that ultimately transitions the aircraft 100 to reduce the error 364. The transition schedule 380 can be similarly constructed as the one depicted in FIG. 12. For instance, in accessing the transition schedule 380, the one or more processors can determine the percent of maximum rotational speed demanded of the electric machines 164, 174, 184, 194 that would ultimately move the aircraft 100 so that the error 364 is reduced. Particularly, the percent of maximum rotational speed demanded of the electric machines 164, 174, 184, 194 that correspond with the determined error 364 are determined by accessing the transition schedule 380, and based on the determined percent of maximum rotational speed demanded of the electric machines 164, 174, 184, 194 that correspond with the determined error 364, one or commands 390 are generated by the one or more processors of the computing system 250. An amount of electrical current can be provided to the electric machines 164, 174, 184, 194 in accordance with the commands 390 so that the first and second propulsors 160, 170 to produce a thrust differential so that the actual orientation of the aircraft 100 meets the demanded orientation of the aircraft 100, and ultimately, so that the aircraft 100 transitions from a horizontal orientation to a vertical orientation.

In some embodiments, the transition schedule used for controlling the propulsors 160, 170, 180, 190 in the horizontal-to-vertical flight transition can be selected from a plurality of predetermined schedules. Each of the plurality of schedules can correspond with a set of operating conditions. For instance, a first schedule can correspond to a first set of operating conditions, a second schedule can correspond to a second set of operating conditions, and so forth. The schedule selected for use can be selected based on the operating conditions associated with the aircraft 100, which can be determined based on the received data 370. The schedule can be selected based on being a closet match to one of the plurality of schedules, for example. It will be appreciated that the closed-loop control scheme of FIG. 15 is provided by way of example only and that other closed-loop control schemes are possible.

Figure 16:
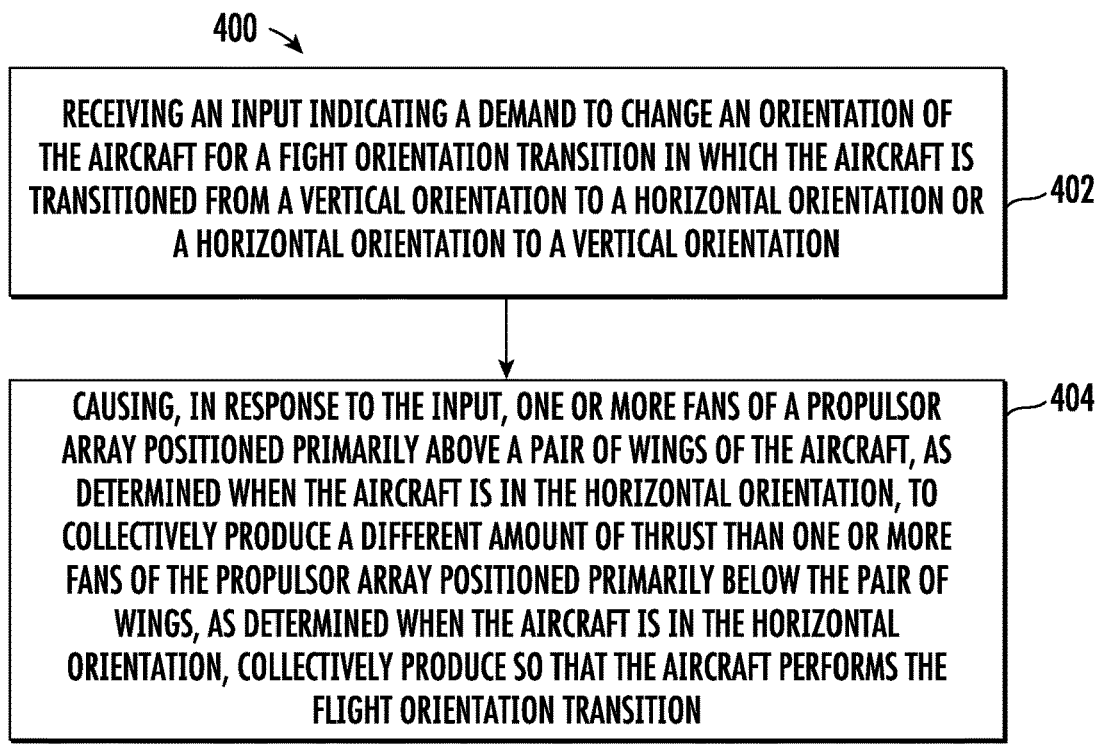
FIG. 16 provides a flow diagram of an exemplary method of operating an aircraft according to one example embodiment of the present disclosure.

FIG. 16 provides a flow diagram of a method (400) of operating an aircraft according to one example embodiment of the present disclosure. For instance, method (400) can be used to operate the aircraft 100 provided herein. However, as will be appreciated, method (400) can be utilized to operate other suitable VTOL aircraft, especially those having a tail-sitter configuration. It will be appreciated that method (400) is discussed herein to describe exemplary aspects of the present subject matter and is not intended to be limiting. Reference may be made to FIGS. 1 through 15 below to provide context to method (400).

At (402), the method (400) includes receiving an input indicating a demand to change an orientation of the aircraft for a flight orientation transition in which the aircraft is transitioned from a vertical orientation to a horizontal orientation or a horizontal orientation to a vertical orientation. As one example, the pilot can move or otherwise manipulate a control within the cockpit to indicate the aircraft is to change an orientation for the flight orientation transition. As another example, the indication can be automatically provided, e.g., based on a trigger condition. The one or more processors of the computing system of the aircraft can receive the input indicating the demand to change an orientation of the aircraft for a flight orientation transition.

At (404), the method (400) includes causing, in response to the input, one or more fans of a propulsor array positioned primarily above a pair of wings of the aircraft, as determined when the aircraft is in the horizontal orientation, to collectively produce a different amount of thrust than one or more fans of the propulsor array positioned primarily below the pair of wings, as determined when the aircraft is in the horizontal orientation, collectively produce so that the aircraft performs the flight orientation transition. For instance, the one or more processors can cause electrical power to be provided to one or more electric machines operable to drive the fans of the fan array. More or less electrical power can be provided to the electric machines so that their associated fans produce more or less thrust. In this way, the fans can be individually controlled so that the one or more fans positioned primarily above the wings collectively produce a different amount of thrust than the one or more fans positioned primarily below the wings collectively produce.

In implementations where the flight orientation transition is a vertical-to-horizontal transition in which the aircraft transitions from the vertical orientation to the horizontal orientation, the one or more fans of the propulsor array positioned primarily above the pair of wings of the aircraft can be caused to collectively produce more thrust than the one or more fans of the propulsor array positioned primarily below the pair of wings collectively produce. Particularly, the electrical power provided to the electric machines associated with the fans positioned primarily above the wings can be increased and the electrical power provided to the electric machines associated with the fans positioned primarily below the wings can be decreased. In this way, the thrust output of the fans positioned primarily above the wings can be increased and the thrust output of the fans positioned primarily below the wings can be decreased. This can create a moment on the aircraft, thereby causing the aircraft to commence or perform the vertical-to-horizontal transition.

In implementations where the flight orientation transition is a horizontal-to-vertical transition in which the aircraft transitions from the horizontal orientation to the vertical orientation, the one or more fans of the propulsor array positioned primarily below the pair of wings of the aircraft can be caused to collectively produce more thrust than the one or more fans of the propulsor array positioned primarily above the pair of wings collectively produce. Particularly, the electrical power provided to the electric machines associated with the fans positioned primarily below the wings can be increased and the electrical power provided to the electric machines associated with the fans positioned primarily above the wings can be decreased. In this way, the thrust output of the fans positioned primarily below the wings can be increased and the thrust output of the fans positioned primarily above the wings can be decreased. This can create a moment on the aircraft, thereby causing the aircraft to commence or perform the horizontal-to-vertical transition.

In some implementations, the aircraft defines a longitudinal direction and includes a fuselage from which the pair of wings extend. One fan of the propulsor array is mounted to the fuselage and aligned with a first wing of the pair of wings when viewed along the longitudinal direction and another fan of the propulsor array is mounted to the fuselage and aligned with a second wing of the pair of wings when viewed along the longitudinal direction. In such implementations, the method (400) can further include causing the fan of the propulsor array aligned with the first wing and the fan of the propulsor array aligned with the second wing to produce thrust as the aircraft performs the flight orientation transition. In this manner, these noted fans can provide stability to the aircraft as the fans above and below the wings produce a thrust differential to transition the aircraft.

In some other implementations, the method (400) can further include receiving data indicating one or more operating conditions associated with the aircraft. The method (400) can also include determining a transition schedule based at least in part on the data, the transition schedule indicating a manner in which the fans of the propulsor array are to be controlled during the flight orientation transition. In such implementations, the one or more fans of the propulsor array positioned primarily above the pair of wings and the one or more fans of the propulsor array positioned primarily below the pair of wings are both caused to collectively produce thrust based at least in part on the transition schedule.

Figure 17:
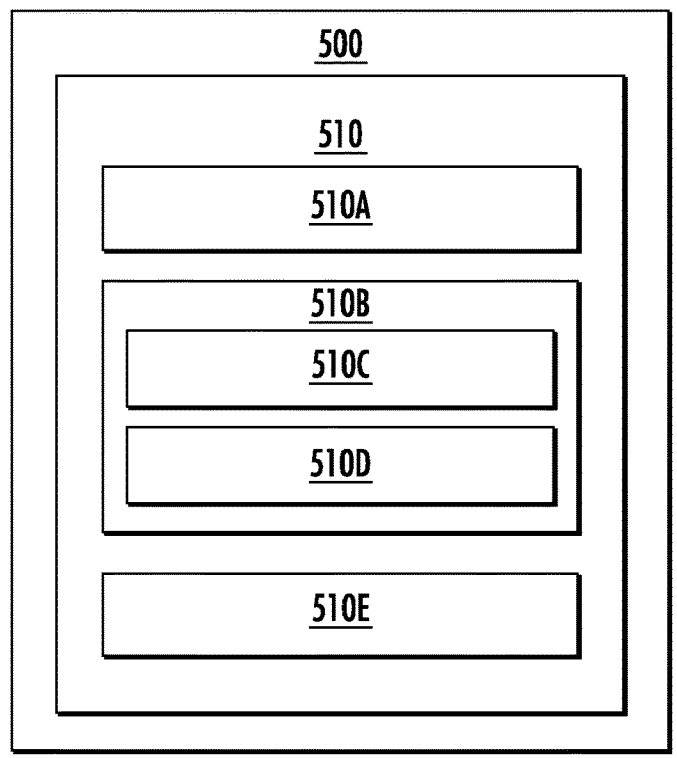
FIG. 17 provides an example computing system according to example embodiments of the present disclosure.

FIG. 17 provides an example computing system 500 according to example embodiments of the present disclosure. The computing system 250 described herein may include various components and perform various functions of the computing system 500 described below, for example.

As shown in FIG. 17, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-executable or computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as operations for controlling propulsors of a tail-sitter aircraft to transition the aircraft between flight orientations, as well as other operations. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, lookup tables, databases, etc.

The computing device(s) 510 can also include a network interface 510E used to communicate, for example, with the other components of system 500 (e.g., via a communication network). The network interface 510E can include any suitable components for interfacing with one or more network(s), including for example, transmitters, receivers, ports, controllers, antennas, and/or other suitable components. One or more devices can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An aircraft, comprising: a fuselage; a pair of wings extending outward from the fuselage opposite one another; a propulsion system having a first propulsor and a second propulsor each mounted to the fuselage, the first propulsor having a fan positioned primarily above and the second propulsor having a fan positioned primarily below the pair of wings as determined when the aircraft is in a horizontal orientation; a computing system having one or more processors, the one or more processors being configured to: cause, in response to a demand to change an orientation of the aircraft for a flight orientation transition in which the aircraft is transitioned from a vertical orientation to a horizontal orientation or a horizontal orientation to a vertical orientation, the fan of the first propulsor and the fan of the second propulsor to produce different amounts of thrust with respect to one another so that the aircraft performs the flight orientation transition.

2. The aircraft of any preceding clause, wherein the flight orientation transition is a vertical-to-horizontal flight transition, and in causing the fan of the first propulsor and the fan of the second propulsor to produce different amounts of thrust, the one or more processors cause the fan of the first propulsor to produce more thrust than the fan of the second propulsor.

3. The aircraft of any preceding clause, wherein the flight orientation transition is a horizontal-to-vertical flight transition, wherein in causing the first propulsor and the second propulsor to produce different amounts of thrust, the one or more processors cause the fan of the second propulsor to produce more thrust than the fan of the first propulsor.

4. The aircraft of any preceding clause, wherein the fan of the first propulsor and the fan of the second propulsor are mounted aft of the pair of wings.

5. The aircraft of any preceding clause, wherein the aircraft defines a longitudinal direction, and wherein the propulsion system has a third propulsor having a fan and a fourth propulsor having a fan, the fan of the third propulsor being mounted to the fuselage circumferentially between the fan of the first propulsor and the fan of the second propulsor and aligned with a first wing of the pair of wings when viewed along the longitudinal direction and the fan of the fourth propulsor being mounted to the fuselage circumferentially between the fan of the first propulsor and the fan of the second propulsor and aligned with a second wing of the pair of wings when viewed along the longitudinal direction.

6. The aircraft of any preceding clause, wherein the one or more processors of the computing system are configured to: receive data indicating one or more operating conditions associated with the aircraft; determine a transition schedule based at least in part on the data, the transition schedule indicating a manner in which the fan of the first propulsor and the fan of the second propulsor are to be controlled during the flight orientation transition, and wherein the fan of the first propulsor and the fan of the second propulsor both produce thrust based at least in part on the transition schedule.

7. The aircraft of any preceding clause, wherein the fan of the first propulsor and the fan of the second propulsor are electrically-driven fans.

8. The aircraft of any preceding clause, wherein the aircraft includes at least three propulsors each having a fan.

9. The aircraft of any preceding clause, wherein the aircraft has a tail-sitter configuration.

10. The aircraft of any preceding clause, wherein in causing the fan of the first propulsor and the fan of the second propulsor to produce different amounts of thrust with respect to one another, the one or more processors of the computing system are configured to cause the fan of the first propulsor to produce at least fifty percent more thrust than the fan of the second propulsor or the fan of the second propulsor to produce at least fifty percent more thrust than the fan of the first propulsor.

11. A method of operating an aircraft, the method comprising: receiving an input indicating a demand to change an orientation of the aircraft for a flight orientation transition in which the aircraft is transitioned from a vertical orientation to a horizontal orientation or a horizontal orientation to a vertical orientation; and causing, in response to the input, one or more fans of a propulsor array positioned primarily above a pair of wings of the aircraft, as determined when the aircraft is in the horizontal orientation, to collectively produce a different amount of thrust than one or more fans of the propulsor array positioned primarily below the pair of wings, as determined when the aircraft is in the horizontal orientation, collectively produce so that the aircraft performs the flight orientation transition.

12. The method of any preceding clause, wherein the aircraft defines a longitudinal direction and includes a fuselage from which the pair of wings extend, and wherein a fan of the propulsor array is mounted to the fuselage and aligned with a first wing of the pair of wings when viewed along the longitudinal direction and a fan of the propulsor array is mounted to the fuselage and aligned with a second wing of the pair of wings when viewed along the longitudinal direction, and wherein the method further comprises: causing the fan of the propulsor array aligned with the first wing and the fan of the propulsor array aligned with the second wing to produce thrust as the aircraft performs the flight orientation transition.

13. The method of any preceding clause, further comprising: receiving data indicating one or more operating conditions associated with the aircraft; determining a transition schedule based at least in part on the data, the transition schedule indicating a manner in which the one or more fans of the propulsor array are to be controlled during the flight orientation transition; and wherein the one or more fans of the propulsor array positioned primarily above the pair of wings and the one or more fans of the propulsor array positioned primarily below the pair of wings are both caused to collectively produce thrust based at least in part on the transition schedule.

14. The method of any preceding clause, wherein the flight orientation transition is a vertical-to-horizontal transition in which the aircraft transitions from the vertical orientation to the horizontal orientation, and wherein causing the one or more fans of the propulsor array positioned primarily above the pair of wings of the aircraft to collectively produce the different amount of thrust than the one or more fans of the propulsor array positioned primarily below the pair of wings collectively produce so that the aircraft performs the flight orientation transition comprises causing the one or more fans of the propulsor array positioned primarily above the pair of wings of the aircraft to collectively produce more thrust than the one or more fans of the propulsor array positioned primarily below the pair of wings.

15. The method of any preceding clause, wherein the flight orientation transition is a horizontal-to-vertical transition in which the aircraft transitions from the horizontal orientation to the vertical orientation, and wherein causing the one or more fans of the propulsor array positioned primarily above the pair of wings of the aircraft to collectively produce the different amount of thrust than the one or more fans of the propulsor array positioned primarily below the pair of wings collectively produce so that the aircraft performs the flight orientation transition comprises causing the one or more fans of the propulsor array positioned primarily below the pair of wings of the aircraft to collectively produce more thrust than the one or more fans of the propulsor array positioned primarily above the pair of wings.

16. A non-transitory computer readable medium comprising computer-executable instructions, which, when executed by one or more processors of a computing system of an aircraft, cause the one or more processors to: cause, in response to a demand to change an orientation of the aircraft for a flight orientation transition in which the aircraft is transitioned from a vertical orientation to a horizontal orientation or a horizontal orientation to a vertical orientation, a fan of a first propulsor and a fan of a second propulsor to produce different amounts of thrust with respect to one another so that the aircraft performs the flight orientation transition, the fan of the first propulsor being positioned primarily above and the fan of the second propulsor being positioned primarily below one or more wings of the aircraft as determined when the aircraft is in the horizontal orientation.

17. The non-transitory computer readable medium of any preceding clause, wherein the flight orientation transition is a vertical-to-horizontal transition in which the aircraft transitions from the vertical orientation to the horizontal orientation, and wherein in causing the first propulsor and the second propulsor to produce different amounts of thrust with respect to one another so that the aircraft performs the flight orientation transition, the one or more processors cause the first propulsor to produce at least twenty-five percent more thrust than the second propulsor.

18. The non-transitory computer readable medium of any preceding clause, wherein the flight orientation transition is a horizontal-to-vertical transition in which the aircraft transitions from the horizontal orientation to the vertical orientation, and wherein in causing the first propulsor and the second propulsor to produce different amounts of thrust with respect to one another so that the aircraft performs the flight orientation transition, the one or more processors cause the second propulsor to produce at least twenty-five percent more thrust than the first propulsor.

19. The non-transitory computer readable medium of any preceding clause, wherein the aircraft includes a fuselage from which the one or more wings extend, the first propulsor and the second propulsor being mounted to the fuselage aft of the one or more wings.

20. The non-transitory computer readable medium of any preceding clause, wherein the aircraft defines a longitudinal direction, and wherein the aircraft includes a third propulsor having a fan and a fourth propulsor having a fan, the fans of the third propulsor and the fourth propulsor being mounted to the fuselage aft of the one or more wings, the fan of the third propulsor being mounted to the fuselage circumferentially between the fan of the first propulsor and the fan of the second propulsor and aligned with a first wing of the one or more wings when viewed along the longitudinal direction, the fan of the fourth propulsor being mounted to the fuselage circumferentially between the fan of the first propulsor and the fan of the second propulsor and aligned with a second wing of the one or more wings when viewed along the longitudinal direction.

What is claimed is:

1. An aircraft, comprising:
   a fuselage;
   a pair of wings extending outward from the fuselage opposite one another;
   a propulsion system having a first propulsor and a second propulsor each mounted to the fuselage, the first propulsor having a fan positioned primarily above and the second propulsor having a fan positioned primarily below the pair of wings as determined when the aircraft is in a horizontal orientation, wherein the first propulsor and the second propulsor are positioned at a same position along a longitudinal axis of the fuselage such that the first propulsor and the second propulsor each intersect a vertical axis at the same position along the longitudinal axis;
   a computing system having one or more processors, the one or more processors being configured to:
      cause, in response to a demand to change an orientation of the aircraft for a flight orientation transition in which the aircraft is transitioned from a vertical orientation to a horizontal orientation or a horizontal orientation to a vertical orientation, the fan of the first propulsor and the fan of the second propulsor to produce different amounts of thrust with respect to one another so that the aircraft performs the flight orientation transition.

2. The aircraft of claim 1, wherein the flight orientation transition is a vertical-to-horizontal flight transition, and in causing the fan of the first propulsor and the fan of the second propulsor to produce different amounts of thrust, the one or more processors cause the fan of the first propulsor to produce more thrust than the fan of the second propulsor.

3. The aircraft of claim 1, wherein the flight orientation transition is a horizontal-to-vertical flight transition, wherein in causing the first propulsor and the second propulsor to produce different amounts of thrust, the one or more processors cause the fan of the second propulsor to produce more thrust than the fan of the first propulsor.

4. The aircraft of claim 1, wherein the fan of the first propulsor and the fan of the second propulsor are mounted aft of the pair of wings.

5. The aircraft of claim 1, wherein the aircraft defines a longitudinal direction, and wherein the propulsion system has a third propulsor having a fan and a fourth propulsor having a fan, the fan of the third propulsor being mounted to the fuselage circumferentially between the fan of the first propulsor and the fan of the second propulsor and aligned with a first wing of the pair of wings when viewed along the longitudinal direction and the fan of the fourth propulsor being mounted to the fuselage circumferentially between the fan of the first propulsor and the fan of the second propulsor and aligned with a second wing of the pair of wings when viewed along the longitudinal direction.

6. The aircraft of claim 1, wherein the one or more processors of the computing system are configured to:
   receive data indicating one or more operating conditions associated with the aircraft;
   determine a transition schedule based at least in part on the data, the transition schedule indicating a manner in which the fan of the first propulsor and the fan of the second propulsor are to be controlled during the flight orientation transition, and
   wherein the fan of the first propulsor and the fan of the second propulsor both produce thrust based at least in part on the transition schedule.

7. The aircraft of claim 1, wherein the fan of the first propulsor and the fan of the second propulsor are electrically-driven fans.

8. The aircraft of claim 1, wherein the aircraft includes at least three propulsors each having a fan.

9. The aircraft of claim 1, wherein the aircraft has a tail-sitter configuration.

10. The aircraft of claim 1, wherein in causing the fan of the first propulsor and the fan of the second propulsor to produce different amounts of thrust with respect to one another, the one or more processors of the computing system are configured to cause the fan of the first propulsor to produce at least fifty percent more thrust than the fan of the second propulsor or the fan of the second propulsor to produce at least fifty percent more thrust than the fan of the first propulsor.

11. A method of operating an aircraft, the method comprising:
   receiving an input indicating a demand to change an orientation of the aircraft for a flight orientation transition in which the aircraft is transitioned from a vertical orientation to a horizontal orientation or a horizontal orientation to a vertical orientation; and
   causing, in response to the input, one or more fans of a propulsor array positioned primarily above a pair of wings of the aircraft, as determined when the aircraft is in the horizontal orientation, to collectively produce a different amount of thrust than one or more fans of the propulsor array positioned primarily below the pair of wings, as determined when the aircraft is in the horizontal orientation, wherein the propulsor array positioned primarily above the pair of wings and the propulsor array positioned primarily below the pair of wings are positioned at a same position along a longitudinal axis of a fuselage such that the propulsor array positioned primarily above the pair of wings and the propulsor array positioned primarily below the pair of wings each intersect a vertical axis at the same position along the longitudinal axis, collectively produce so that the aircraft performs the flight orientation transition.

12. The method of claim 11, wherein the aircraft defines a longitudinal direction and includes a fuselage from which the pair of wings extend, and wherein a fan of the propulsor array is mounted to the fuselage and aligned with a first wing of the pair of wings when viewed along the longitudinal direction and a fan of the propulsor array is mounted to the fuselage and aligned with a second wing of the pair of wings when viewed along the longitudinal direction, and wherein the method further comprises:
causing the fan of the propulsor array aligned with the first wing and the fan of the propulsor array aligned with the second wing to produce thrust as the aircraft performs the flight orientation transition.

13. The method of claim 11, further comprising:
receiving data indicating one or more operating conditions associated with the aircraft;
determining a transition schedule based at least in part on the data, the transition schedule indicating a manner in which the one or more fans of the propulsor array are to be controlled during the flight orientation transition; and
wherein the one or more fans of the propulsor array positioned primarily above the pair of wings and the one or more fans of the propulsor array positioned primarily below the pair of wings are both caused to collectively produce thrust based at least in part on the transition schedule.

14. The method of claim 11, wherein the flight orientation transition is a vertical-to-horizontal transition in which the aircraft transitions from the vertical orientation to the horizontal orientation, and wherein causing the one or more fans of the propulsor array positioned primarily above the pair of wings of the aircraft to collectively produce the different amount of thrust than the one or more fans of the propulsor array positioned primarily below the pair of wings collectively produce so that the aircraft performs the flight orientation transition comprises causing the one or more fans of the propulsor array positioned primarily above the pair of wings of the aircraft to collectively produce more thrust than the one or more fans of the propulsor array positioned primarily below the pair of wings.

15. The method of claim 11, wherein the flight orientation transition is a horizontal-to-vertical transition in which the aircraft transitions from the horizontal orientation to the vertical orientation, and wherein causing the one or more fans of the propulsor array positioned primarily above the pair of wings of the aircraft to collectively produce the different amount of thrust than the one or more fans of the propulsor array positioned primarily below the pair of wings collectively produce so that the aircraft performs the flight orientation transition comprises causing the one or more fans of the propulsor array positioned primarily below the pair of wings of the aircraft to collectively produce more thrust than the one or more fans of the propulsor array positioned primarily above the pair of wings.

16. A non-transitory computer readable medium comprising computer-executable instructions, which, when executed by one or more processors of a computing system of an aircraft, cause the one or more processors to:
cause, in response to a demand to change an orientation of the aircraft for a flight orientation transition in which the aircraft is transitioned from a vertical orientation to a horizontal orientation or a horizontal orientation to a vertical orientation, a fan of a first propulsor and a fan of a second propulsor to produce different amounts of thrust with respect to one another so that the aircraft performs the flight orientation transition, the fan of the first propulsor being positioned primarily above and the fan of the second propulsor being positioned primarily below one or more wings of the aircraft as determined when the aircraft is in the horizontal orientation, wherein the fan of the first propulsor and the fan of the second propulsor are positioned at a same position along a longitudinal axis of the fuselage such that the first propulsor and the second propulsor each intersect a vertical axis at the same position along the longitudinal axis.

17. The non-transitory computer readable medium of claim 16, wherein the flight orientation transition is a vertical-to-horizontal transition in which the aircraft transitions from the vertical orientation to the horizontal orientation, and wherein in causing the first propulsor and the second propulsor to produce different amounts of thrust with respect to one another so that the aircraft performs the flight orientation transition, the one or more processors cause the first propulsor to produce at least twenty-five percent more thrust than the second propulsor.

18. The non-transitory computer readable medium of claim 16, wherein the flight orientation transition is a horizontal-to-vertical transition in which the aircraft transitions from the horizontal orientation to the vertical orientation, and wherein in causing the first propulsor and the second propulsor to produce different amounts of thrust with respect to one another so that the aircraft performs the flight orientation transition, the one or more processors cause the second propulsor to produce at least twenty-five percent more thrust than the first propulsor.

19. The non-transitory computer readable medium of claim 16, wherein the aircraft includes a fuselage from which the one or more wings extend, the first propulsor and the second propulsor being mounted to the fuselage aft of the one or more wings.

20. The non-transitory computer readable medium of claim 19, wherein the aircraft defines a longitudinal direction, and wherein the aircraft includes a third propulsor having a fan and a fourth propulsor having a fan, the fans of the third propulsor and the fourth propulsor being mounted to the fuselage aft of the one or more wings, the fan of the third propulsor being mounted to the fuselage circumferentially between the fan of the first propulsor and the fan of the second propulsor and aligned with a first wing of the one or more wings when viewed along the longitudinal direction, the fan of the fourth propulsor being mounted to the fuselage circumferentially between the fan of the first propulsor and the fan of the second propulsor and aligned with a second wing of the one or more wings when viewed along the longitudinal direction.

* * * * *